(12) United States Patent
Sakai

(10) Patent No.: US 12,354,320 B2
(45) Date of Patent: Jul. 8, 2025

(54) INFORMATION PROCESSING DEVICE, CONTROL METHOD, AND STORAGE MEDIUM

(71) Applicant: NEC Corporation, Tokyo (JP)

(72) Inventor: Ryosuke Sakai, Tokyo (JP)

(73) Assignee: NEC CORPORATION, Tokyo (JP)

( * ) Notice: Subject to any disclaimer, the term of this patent is extended or adjusted under 35 U.S.C. 154(b) by 367 days.

(21) Appl. No.: 17/916,823

(22) PCT Filed: Apr. 13, 2020

(86) PCT No.: PCT/JP2020/016311
§ 371 (c)(1),
(2) Date: Oct. 4, 2022

(87) PCT Pub. No.: WO2021/210046
PCT Pub. Date: Oct. 21, 2021

(65) Prior Publication Data
US 2023/0186591 A1    Jun. 15, 2023

(51) Int. Cl.
*G06V 10/44* (2022.01)
*G06T 7/68* (2017.01)
(Continued)

(52) U.S. Cl.
CPC ............... *G06V 10/44* (2022.01); *G06T 7/68* (2017.01); *G06T 7/73* (2017.01); *G06V 20/70* (2022.01)

(58) Field of Classification Search
CPC ...... G06V 10/44; G06V 20/70; G06V 10/774; G06V 20/20; G06T 7/68; G06T 7/73
See application file for complete search history.

(56) References Cited

U.S. PATENT DOCUMENTS

2010/0299355 A1    11/2010    Shiiyama et al.
2011/0187746 A1    8/2011    Suto et al.
(Continued)

FOREIGN PATENT DOCUMENTS

JP    2010-272092 A    12/2010
JP    2011-159162 A    8/2011
(Continued)

OTHER PUBLICATIONS

"Tahar Battikh et al., Camera Calibration using Court Models for Real-time Augmenting Soccer Scenes, Jan. 2010, Multimed Tools Appl 51: 997-1011" (Year: 2010).*
(Continued)

*Primary Examiner* — Chineyere Wills-Burns
*Assistant Examiner* — Phuong Hau Cai
(74) *Attorney, Agent, or Firm* — Sughrue Mion, PLLC

(57) ABSTRACT

An information processing device 4 includes a feature point acquiring means 41A and a label determining means 43A. The feature point acquiring means 41A is configured to acquire, based on a captured image "Im" captured by an imaging unit 15A, a combination of positions of feature points of a symmetrical object with a symmetry and second labels defined to integrate or change first labels that are unique labels of the feature points based on the symmetry of the symmetrical object. The label determination means 43A is configured to determine a first label to be assigned to each of the feature points based on additional information to break the symmetry and the second labels.

12 Claims, 16 Drawing Sheets

(51) Int. Cl.
    *G06T 7/73*           (2017.01)
    *G06V 20/70*        (2022.01)

(56) References Cited

U.S. PATENT DOCUMENTS

| | | |
|---|---|---|
| 2012/0002867 A1 | 1/2012 | Ishiyama et al. |
| 2015/0049116 A1 | 2/2015 | Suto et al. |
| 2016/0035141 A1 | 2/2016 | Suto et al. |
| 2016/0125657 A1 | 5/2016 | Suto et al. |
| 2018/0012415 A1 | 1/2018 | Suto et al. |
| 2018/0315249 A1 | 11/2018 | Suto et al. |
| 2019/0164348 A1 | 5/2019 | Suto et al. |
| 2020/0066057 A1 | 2/2020 | Suto et al. |
| 2021/0027543 A1 | 1/2021 | Suto et al. |
| 2022/0076499 A1 | 3/2022 | Suto et al. |

FOREIGN PATENT DOCUMENTS

| | | |
|---|---|---|
| JP | 2012-038795 A | 2/2012 |
| WO | 2010/104181 A1 | 9/2010 |

OTHER PUBLICATIONS

"Jianhui Chen et al., Sports Camera Calibration via Synthetic Data, 2019, Proceedings of the IEEE/CVF Conference on Computer Vision and Pattern Recognition Workshops" (Year: 2019).*

"Jase Seok Jang et al., Depth-of-Field Analysis for Focused Augmented Mirror, 2015, CGI2015 Manuscript No." (Year: 2015).*

International Search Report for PCT Application No. PCT/JP2020/016311, mailed on Jul. 14, 2020.

* cited by examiner

SECOND LABEL: 0
ADDITIONAL INFORMATION "THIRD STAGE"
FIRST LABEL: 5

SECOND LABEL: 1
ADDITIONAL INFORMATION "THIRD STAGE"
FIRST LABEL: 6

SECOND LABEL: 0
ADDITIONAL INFORMATION "FOURTH STAGE"
FIRST LABEL: 7

SECOND LABEL: 1
ADDITIONAL INFORMATION "FOURTH STAGE"
FIRST LABEL: 8

INFORMATION PROCESSING DEVICE, CONTROL METHOD, AND STORAGE MEDIUM

This application is a National Stage Entry of PCT/JP2020/016311 filed on Apr. 13, 2020, the contents of all of which are incorporated herein by reference, in their entirety.

TECHNICAL FIELD

The present disclosure relates to a technical field of an information processing device, a control method, and a storage medium for performing feature extraction based on an image.

BACKGROUND ART

For such a device providing an augmented reality (AR: Augmented Reality), there is a technique of determining the display position of an image (so-called AR image) to be displayed over the view that the user visually recognizes based on images captured by a camera. For example, Patent Literature 1 discloses an image processing device configured to store feature data representing features of the appearances of objects and to generate an environment map representing the position of an object present in the real space based on an image obtained from an imaging device and the above feature data thereby to display, based on the environment map, a description relating to a series of procedures of the work to be performed in the real space.

CITATION LIST

Patent Literature

Patent Literature 1: JP 2011-159162A

SUMMARY

Problem to be Solved

In feature extraction of a symmetrical object having a symmetry, labels to be attached to feature points existing at symmetrical positions vary depending on the position to observe the symmetrical object and therefore confusion of label identification tends to occur for such feature points, which causes an issue that the discrimination accuracy decreases. In view of the above-described issue, it is therefore an example object of the present disclosure to provide an information processing device, a control method, and a storage medium capable of suitably executing feature extraction.

Means for Solving the Problem

In one mode of the information processing device, there is provided an information processing device including: a feature point acquiring means configured to acquire, based on a captured image captured by an imaging unit, a combination of positions of feature points of a symmetrical object with a symmetry and second labels, the second labels being defined to integrate or change first labels that are unique labels of the feature points based on the symmetry of the symmetrical object; and a label determination means configured to determine a first label to be assigned to each of the feature points based on additional information to break the symmetry and the second labels.

In one mode of the control method, there is provided a control method executed by an information processing device, the control method including: acquiring, based on a captured image captured by an imaging unit, a combination of positions of feature points of a symmetrical object with a symmetry and second labels, the second labels being defined to integrate or change first labels that are unique labels of the feature points based on the symmetry of the symmetrical object; and determining a first label to be assigned to each of the feature points based on additional information to break the symmetry and the second labels.

In one mode of the storage medium, there is provided a storage medium storing a program executed by a computer, the program causing the computer to function as: a feature point acquiring means configured to acquire, based on a captured image captured by an imaging unit, a combination of positions of feature points of a symmetrical object with a symmetry and second labels, the second labels being defined to integrate or change first labels that are unique labels of the feature points based on the symmetry of the symmetrical object; and a label determination means configured to determine a first label to be assigned to each of the feature points based on additional information to break the symmetry and the second labels.

Effect

An example advantage according to the present invention is to perform feature extraction of a symmetrical object having a symmetry.

EXAMPLE EMBODIMENTS

Hereinafter, an example embodiment of an information processing device, a control method, and a storage medium will be described with reference to the drawings.

First Example Embodiment (1) Schematic Configuration

Figure 1:
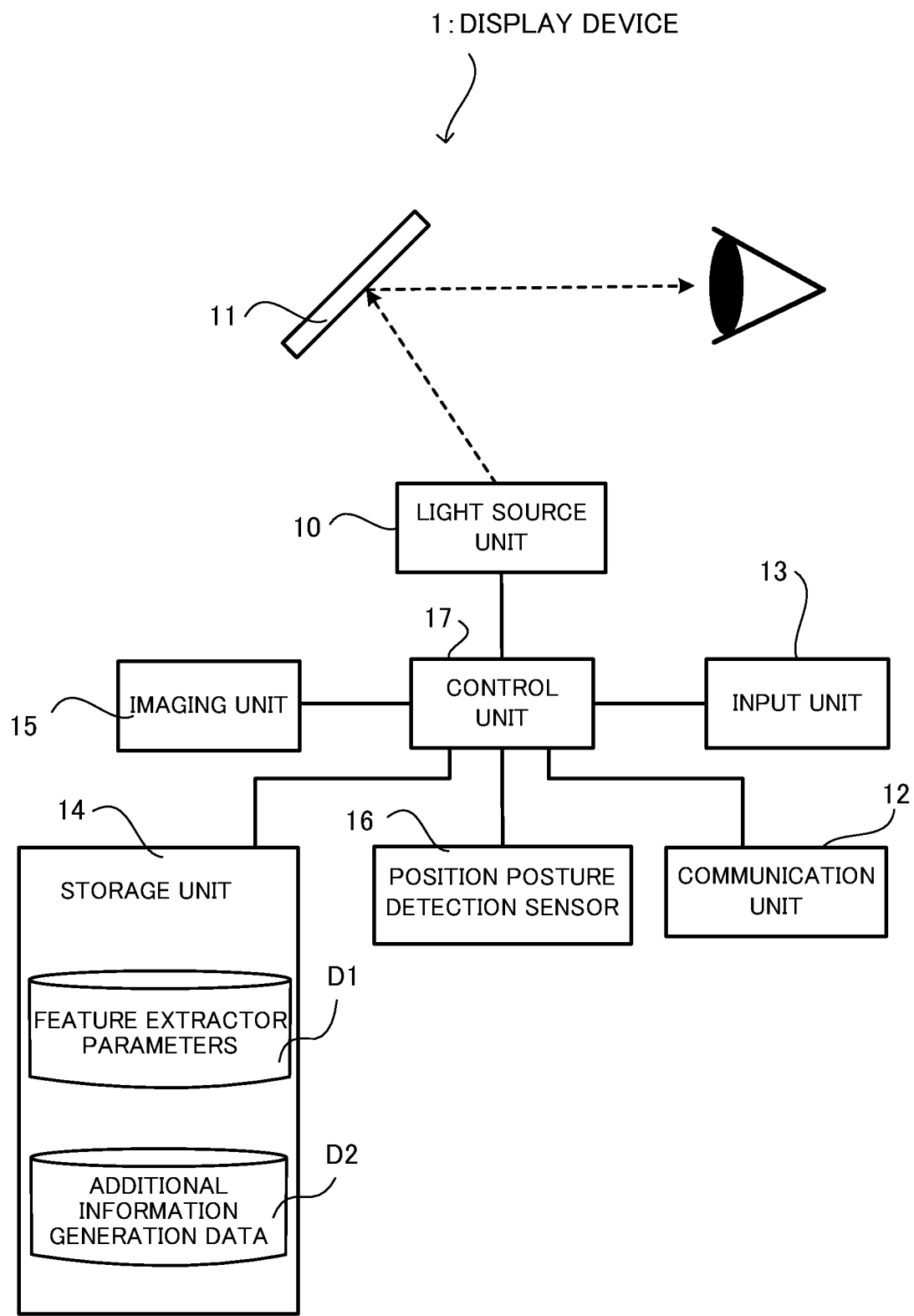
FIG. 1 illustrates a schematic configuration of a display device according to a first example embodiment.

FIG. 1 is a schematic configuration diagram of a display device 1 according to the first example embodiment. The display device 1 is a user-wearable device, and examples of the display device 1 include a see-through eyeglass device configured to be wearable on the head of the user. Then, the display device 1 provides an augmented reality (AR: Augmented Reality) in the sports viewing or theater (including concert) viewing or the like by displaying visual information superimposed on the real view (landscape). The visual information is a two or three dimensional virtual object, and is referred to as "virtual object" hereinafter. The display device 1 may display the virtual object only on one eye of the user, or may display the virtual object on both eyes.

In this example embodiment, the display device 1 performs feature extraction of a stationary structure (also referred to as "reference structure Rtag") which functions as a reference when displaying a virtual object, and, based on the feature extraction result, it superimposes and displays the virtual object on or around the reference structure Rtag. Here, the reference structure Rtag is a field or the like for sports or a game, and the virtual object indicates additional information to assist a user in performing sports viewing or theater viewing. Examples of the virtual object include a score board to be displayed above the tennis court in the case of tennis, and a line indicative of the world record in real time to be superimposed on a pool during a swimming competition in the case of competitive swimming, and include a virtual performer to be superimposed on the stage in a theater.

The reference structure Rtag is a symmetrical object having a symmetry. Examples of the symmetry include n-fold symmetry (n is a natural number equal to two or more, and "n=2" is a point symmetry), line symmetry, mirror symmetry, and translational symmetry. Examples of the reference structure Rtag include: each sports field of tennis, swimming, soccer, tabletop, basketball, rugby, and other sports; each game field of shogi and go; a theater stage; and a model of a sports field. Here, generally, it is difficult to distinguish feature points, which exist at symmetrical positions, of the reference structure Rtag with high symmetry such as a sports field. In view of the above, the display device 1 according to the present example embodiment suitably extracts a combination of the position of each feature point of the reference structure Rtag and the corresponding label unique to the each feature point.

As shown in FIG. 1, the display device 1 includes a light source unit 10, an optical element 11, a communication unit 12, an input unit 13, a storage unit 14, an imaging unit (camera) 15, a position posture detection sensor 16, and a control unit 17.

The light source unit 10 has a light source such as a laser light source and/or an LCD (Liquid Crystal Display) light source and emits light based on the driving signal supplied from the control unit 17. The optical element 11 has a predetermined transmittance and lets at least a portion of the external light pass through to enter the user's eye, and reflects at least a portion of the light from the light source unit 10 toward the user's eye. Thus, the virtual image corresponding to the virtual object formed by the display device 1 is visually recognized by the user in such a state where the virtual image overlaps with the view (landscape). The optical element 11 may be a half mirror whose transmittance and reflectance are substantially equal, or a mirror (so-called beam splitter) whose transmittance and reflectance are not equal. A combination of the light source unit 10 and the optical element 11 is an example of a "display unit".

The communication unit 12 performs transmission and reception of data with external devices based on the control by the control unit 17. For example, in the case where the user uses the display device 1 for a sports viewing or a theater viewing, on the basis of the control by the control unit 17, the communication unit 12 receives information on the virtual object to be displayed by the display device 1 from a server device managed by a promoter.

The input unit 13 generates an input signal based on the user's operation and transmits the input signal to the control unit 17. Examples of the input unit 13 include a button, an arrow pad, and a voice input device which are used for the user to instruct the display device 1.

The imaging unit 15 generates, based on the control by the control unit 17, an image in which the front direction of the display device 1 is photographed, and supplies the generated image (also referred to as "captured image Im") to the control unit 17.

The position posture detection sensor 16 is one or more sensors (sensor group) configured to detect the position and posture (orientation) of the display device 1. Examples of the position posture detection sensor 16 include a positioning sensor such as a GPS (Global Positioning Satellite) receiver, and a posture detection sensor configured to detect the change in the relative posture of the display device 1 such as a gyroscope sensor, an acceleration sensor, an IMU (Inertial Measurement Unit). The position posture detection sensor 16 supplies the generated detection signal relating to the position and posture of the display device 1 to the control unit 17. Instead of detecting the position of the display device 1 by using the positioning sensor, the control unit 17 may identify the position of the display device 1 based on a signal received from a beacon terminal or a wireless LAN device provided in the venue, for example. In another example, the control unit 17 may identify the position of the display device 1 based on a known position estimation technique using an AR marker. In these cases, the position posture detection sensor 16 may not include any positioning sensor.

The control unit 17 includes performs overall control of the display device 1 and includes, for example, one or more processors such as a CPU (Central Processing Unit) and a GPU (Graphics Processing Unit) and a volatile memory that functions as a working memory of the processors.

The storage unit 14 is a nonvolatile memory configured to store various information necessary for the control unit 17 to control the display device 1. The storage 14 may include a removable storage medium such as a flash memory. Further, the storage unit 14 stores a program to be executed by the control unit 17.

Further, the storage unit 14 stores feature extractor parameters D1 and additional information generation data D2.

The feature extractor parameters D1 are information on parameters for generating a feature extractor configured to extract feature points of the reference structure Rtag from the captured image Im generated by the imaging unit 15. The feature extractor is, for example, a learning model trained to output, when the captured image Im is inputted, information indicative of a combination of the position of each feature point to be extracted and the corresponding label indicating the classification of the each feature point. For example, the feature extractor outputs, for each feature point present in the captured image Im, a combination of the corresponding label and a reliability map or a coordinate value of the position of the each feature point in the captured image Im. The reliability map is a map on an image showing the reliability of the each feature point with respect to each coordinate value. The term "coordinate value" may be a value indicative of a position in an image in pixel units, or may be a value indicative of a position in an image in sub-pixel units. The learning model to be used for learning of the feature extractor may be a learning model based on a neural network, or it may be another type of learning model such as a support vector machine, or it may be a combination of these. For example, if the learning model described above is a neural network such as a convolutional neural network, the feature extractor parameters D1 include a variety of parameters regarding the layer structure, the neuron structure of each layer, the number of filters and filter sizes in each layer, and the weights for each element of each filter.

Hereafter, the term "first label" refers to a label (identification information) uniquely assigned to each feature point to be extracted from the reference structure Rtag, and the term "second label" refers to a revised first label reassigned based on the symmetry of the reference structure Rtag. In the present example embodiment, the second label is assigned so that the same label is assigned to the feature points existing at the symmetrical positions to one another. Hereafter, the number of second labels associated with one first label based on the symmetry is also referred to as "label integration number N". The feature extractor configured based on the feature extractor parameters D1 is trained to output a combination, for each feature point, of the second label and the reliability map or the coordinate value regarding the position of the each feature point in the image when the captured image Im is inputted. In this case, the feature extractor may be configured for each second label.

The additional information generation data D2 is data to be used for generating the additional information "Ia", which is information for breaking the symmetry of the reference structure Rtag. Here, the additional information Ia is, in other words, information for converting the second label to the first label by uniquely specifying the orientation of the reference structure Rtag in the captured image Im. For example, the additional information Ia is information indicating any of 1 to N (N is the label integration number) according to the positional relation between the display device 1 and the reference structure Rtag.

The first example of the additional information generation data D2 is seat information indicating the position of the seat of the person who wears the display device 1 and who observes the reference structure Rtag. This seat information is the information by which the positional relation (i.e., the azimuth orientation of the other when one is used as a reference) between the seat and the reference structure Rtag can be specified. The second example of the additional information generation data D2 is the information on the absolute position of the reference structure Rtag. In this case, as will be described later, based on the position of the reference structure Rtag indicated by the present position of the display device 1 detected by the position posture detection sensor 16 and the position of the reference structure Rtag indicated by the additional information generation data D2, the display device 1 generates additional information Ia in accordance with the positional relation between the display device 1 and the reference structure Rtag. The third example of the additional information generation data D2 is parameters of an inference engine (also referred to as "characteristic object inference engine") configured to infer, based on the captured image Im, the positional relation between the reference structure Rtag and a characteristic object (i.e., feature) existing around the reference structure Rtag. The characteristic object inference engine may be designed to directly output the additional information Ia.

Here, the characteristic object is an object whose positional relation with respect to the reference structure Rtag is predetermined. Examples of the characteristic object include a referee chair near a tennis court, a piece holder near shogi board, and any other object (always installed object) required in a competition or a game performed on the reference structure Rtag. In other instances, the characteristic object may be a feature portion of a stadium in which the reference structure Rtag is provided, such as an entrance to the reference structure Rtag, a floor portion having a unique color or pattern around the reference structure Rtag.

The configuration of the display device 1 shown in FIG. 1 is an example, and various changes may be applied to this configuration. For example, the display device 1 may be further equipped with a speaker for outputting sound under the control of the control unit 17. Further, the display device 1 may be equipped with a gaze detection camera for determining whether or not to display the virtual object in accordance with the line of sight of the user and/or for determining the display position of the virtual object.

(2) Functional Block

Figure 2:
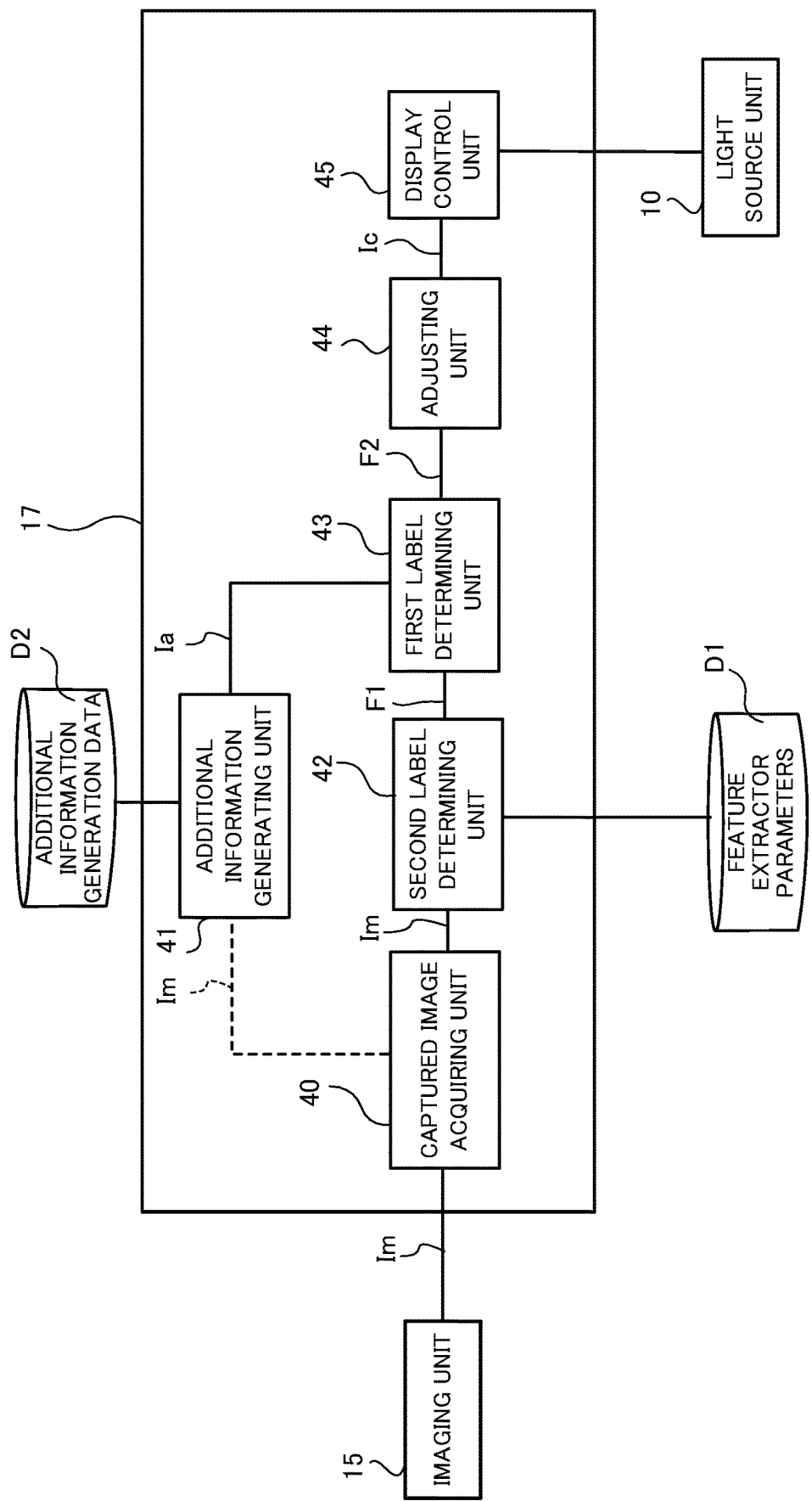
FIG. 2 illustrates a block diagram showing a functional configuration of a control unit.

FIG. 2 is a block diagram showing a functional configuration of the control unit 17. As shown in FIG. 2, the control unit 17 functionally includes a captured image acquiring unit 40, an additional information generating unit 41, a second label feature extracting unit 42, a first label determining unit 43, an adjusting unit 44, and a display control unit 45. As described below, the control unit 17 determines the first label to be added to each feature point extracted from the captured image Im based on the additional information Ia. Thus, the control unit 17 performs an accurate feature extracting process even for the reference structure Rtag having a symmetry. In FIG. 2, blocks which exchanges data with each other are connected by solid line (and by broken line for blocks between which data transfer is not essential). However, combinations of blocks which exchange data with each other are not limited to the combinations shown in FIG. 2. The same applies to any other functional block diagrams to be described later.

The captured image acquiring unit 40 acquires the captured image Im generated by the imaging unit 15 and supplies the captured image Im to the additional information generating unit 41 and the second label feature extracting unit 42. In such a case where the additional information generating unit 41 generates the additional information Ia without using the captured image Im, the captured image acquiring unit 40 may not supply the captured image Im to the additional information generating unit 41.

The additional information generating unit 41 generates, based on the additional information generation data D2, additional information Ia which breaks the symmetry of the reference structure Rtag.

For example, when the additional information generation data D2 is the seat information regarding the wearer of the display device 1, the additional information generating unit 41 generates the additional information Ia in accordance with the positional relation between the display device 1 and the reference structure Rtag which is identified from the seat information.

For example, if the seat information indicates the seat number, the additional information generating unit 41 generates the additional information Ia by referring to the table information indicating the positional relation (e.g., the azimuth orientation of one with respect to the other) between the display device 1 and the reference structure Rtag for each seat number. In this case, for example, to specify the above-mentioned positional relation, the additional information generating unit 41 determines in which direction (e.g., north side, south side, west side, or east side) the display device 1 exists with respect to the reference structure Rtag, and generates the additional information Ia in accordance with the determination result. In some embodiments, the additional information generating unit 41 generates the additional information Ia indicating more detailed orientation with increase in the label integration number N. In other words, the additional information generating unit 41 generates the additional information Ia which indicates at least one of the directions divided by the label integration number N. Further, when the seat information indicates the seat position, the additional information generating unit 41 identifies the positional relation between the display device 1 and the reference structure Rtag based on the seat information and the position information of the reference structure Rtag stored in advance in the storage unit 14 or the like, and then generates the additional information Ia in accordance with the identified positional relation.

Further, when the additional information generation data D2 indicates parameters of the characteristic object inference engine, the additional information generation unit 41 inputs the captured image Im supplied from the captured image acquisition unit 40 to the characteristic object inference engine configured based on the additional information generation data D2. In this case, the additional information generating unit 41 generates the additional information Ia in accordance with the positional relation, in the captured image Im, between the reference structure Rtag and a characteristic object present around the reference structure Rtag.

Further, the additional information generating unit 41 may generate the additional information Ia based on the position information regarding the display device 1 outputted by the position posture detection sensor 16. In this case, the additional information generation data D2 is, for example, the position information regarding the reference structure Rtag, and the additional information generating unit 41 identifies the positional relation between the display device 1 and the reference structure Rtag based on the output from the position posture detection sensor 16 and the additional information generation data D2, and then generates the additional information Ia in accordance with the identified positional relation. A specific example of the process to be executed by the additional information generating unit 41 will be described later with reference to FIGS. 3 to 5.

The second label feature extracting unit 42 extracts, based on information outputted from the feature extractor configured by the feature extractor parameters D1, feature points to which the second labels are assigned in accordance with the symmetry of the reference structure Rtag, wherein the above-mentioned information is outputted from the feature extractor by inputting the captured image Im to the feature extractor. The second label feature extracting unit 42 supplies the first label determining unit 43 with information (also referred to as "first feature point information F1") indicating the combination of the coordinate value, in the captured image Im, of each feature point and the corresponding second label.

The first label determining unit 43 converts, based on the additional information Ia, the second label assigned to each feature point in the first feature point information F1 supplied from the second label feature extracting unit 42 into the first label. The first label determining unit 43 supplies information (also referred to as "second feature point information F2") indicating a combination of the coordinate value of each feature point indicated by the first feature point information F1 and the first label corresponding to the each feature point to the adjusting unit 44. The conversion method to the first label based on the additional information Ia will be described later.

The adjusting unit 44 performs, based on the second feature point information F2, a calibration process for associating the space which the display device 1 recognizes with the real-world space. In this calibration process, the adjusting unit 44 generates coordinate transformation information "Ic" for converting the three-dimensional coordinate system (also referred to as "device coordinate system") which the display device 1 uses as reference into a three-dimensional coordinate system (also referred to as "structural coordinate system") which bases the reference structure Rtag. Then, the adjusting unit 44 supplies the generated coordinate conversion information Ic to the display control unit 45.

The display control unit 45 generates a drive signal for driving the light source unit 10 based on the coordinate conversion information Ic supplied from the adjusting unit 44 and supplies the drive signal to the light source unit 10 thereby to cause the optical element 11 of the light source unit 10 to emit light (also referred to as "display light") for displaying a virtual object. Accordingly, the control unit 17 allows the user to visually recognize the virtual object. In some embodiments, the adjusting unit 44 and the display control unit 45 may perform calibration and display control according to any method adopted in AR devices.

Each component of the captured image acquiring unit 40, the additional information generating unit 41, the second label feature extracting unit 42, the first label determining unit 43, the adjusting unit 44, and the display control unit 45 described in FIG. 2 can be realized, for example, by the control unit 17 executing the program. More specifically, each component can be realized by the control unit 17 executing the program stored in the storage unit 14. In addition, the necessary programs may be recorded in any nonvolatile recording medium and installed as necessary to realize each component. Each of these components is not limited to being implemented by software using a program, and may be implemented by any combination of hardware, firmware and software. Each of these components may also be implemented using user programmable integrated circuitry, such as, for example, FPGA (Field-Programmable Gate Array) or a microcomputer. In this case, the integrated circuit may be used to realize a program functioning as each of the above-described components. Thus, each component may be implemented in hardware other than a processor. The above is the same in other example embodiments to be described later.

(3) Specific Examples

Next, a description will be given of the process executed by the control unit 17 described in FIG. 2 using specific examples in which a tennis court is used as the reference structure Rtag.

Figure 3:
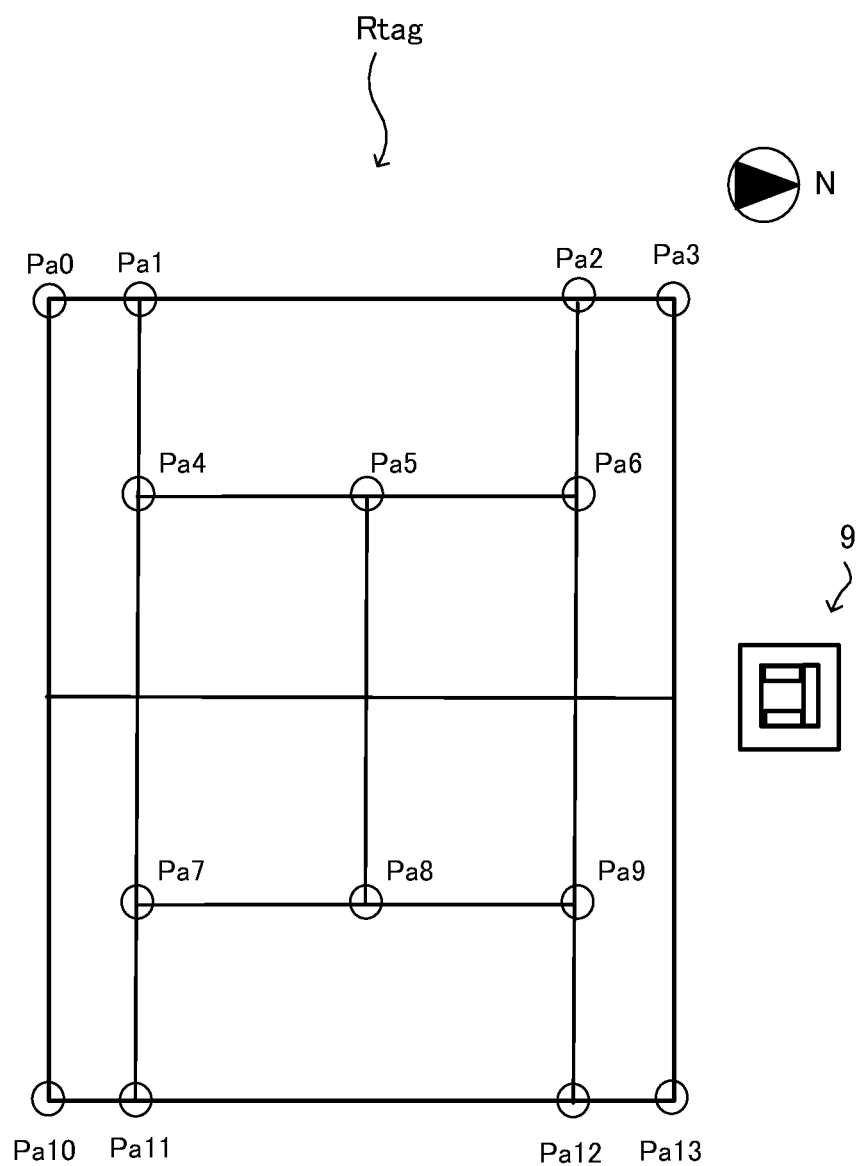
FIG. 3 is a bird's-eye view of a tennis court showing feature points together with corresponding first labels.
Figure 4:
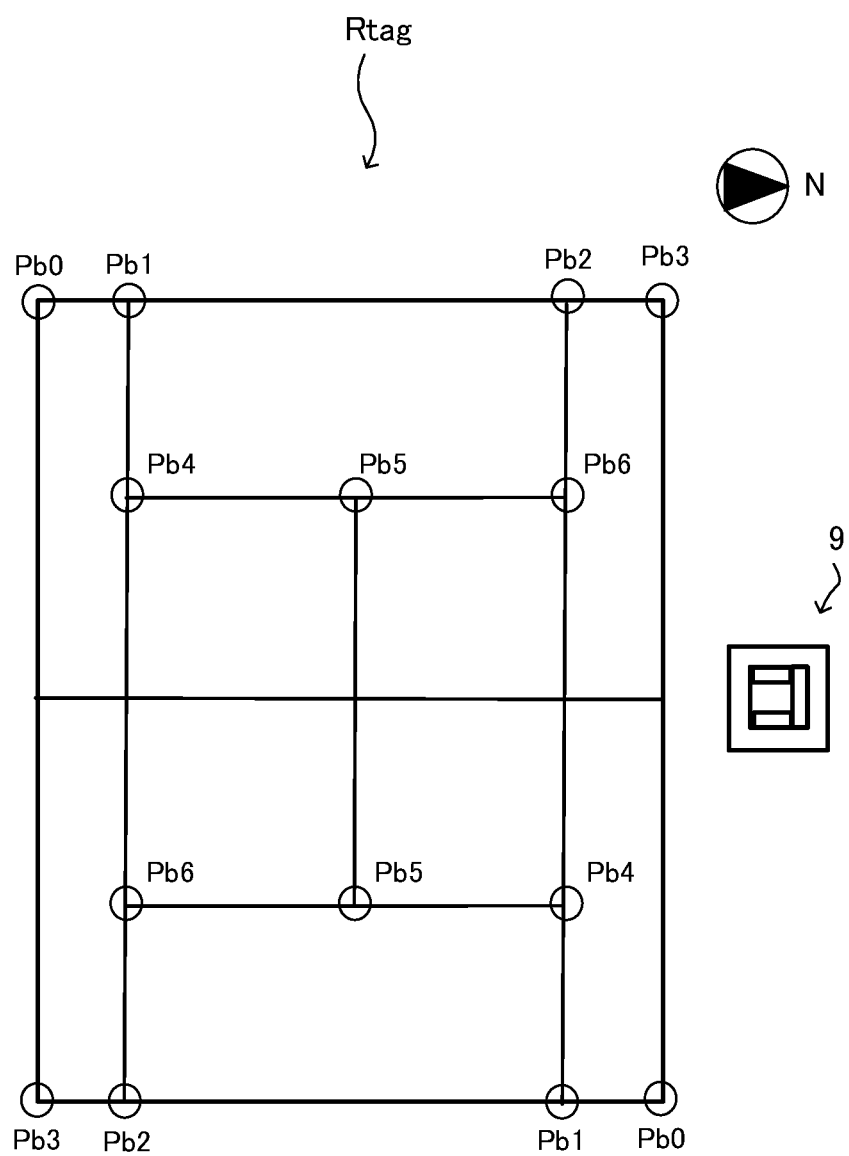
FIG. 4 is a bird's-eye view of a tennis court showing feature points together with corresponding first labels.

FIGS. 3 and 4 are bird's-eye views of a tennis court which is used as the reference structure Rtag. In FIG. 3, feature points to be extracted are circled, and the first labels "Pa0" to "Pa13" respectively corresponding to the feature points are clearly indicated. Further, in FIG. 4, the feature points are circled and the second label "Pa0" to "Pa6" corresponding thereto are clearly indicated. On the north side of the tennis court, there is a referee chair 9.

As shown in FIG. 3, the first labels Pa0 to Pa13 each of which is a unique label are assigned to the feature points of tennis court to be extracted, respectively. Here, the first labels Pa0 to Pa3 are set respectively, in order from south to north, to the four feature points on the baseline of the west side of the court that region part of the feature points of the reference structure Rtag while the first labels Pa4 to Pa6 are set respectively to the three feature points on the service line of the same side of the court. Further, the first labels Pa7 to Pa9 are set, in order from south to north, to three feature points on the service line of the east side of the court, respectively, and the first labels Pa10 to Pa13 are set, in the same way, to the four feature points on the baseline of the same side of the court, respectively. Accordingly, each first label can be uniquely identified based on: the absolute positional relation identified by the orientation of the reference structure Rtag with respect to a characteristic object (here, the referee chair 9) existing around the reference structure Rtag; and/or the absolute positional relation among the feature points.

In addition, as shown in FIG. 4, since the tennis court is point-symmetric in which the number of label integration N is "2", the same second label is assigned to two feature points existing at positions that are point-symmetric. For example, the same second label Pb0 is assigned to each feature point of the first label Pa0 and the first label Pa13 present at point-symmetric positions with respect to the center of gravity of the reference structure Rtag.

Figure 5A:
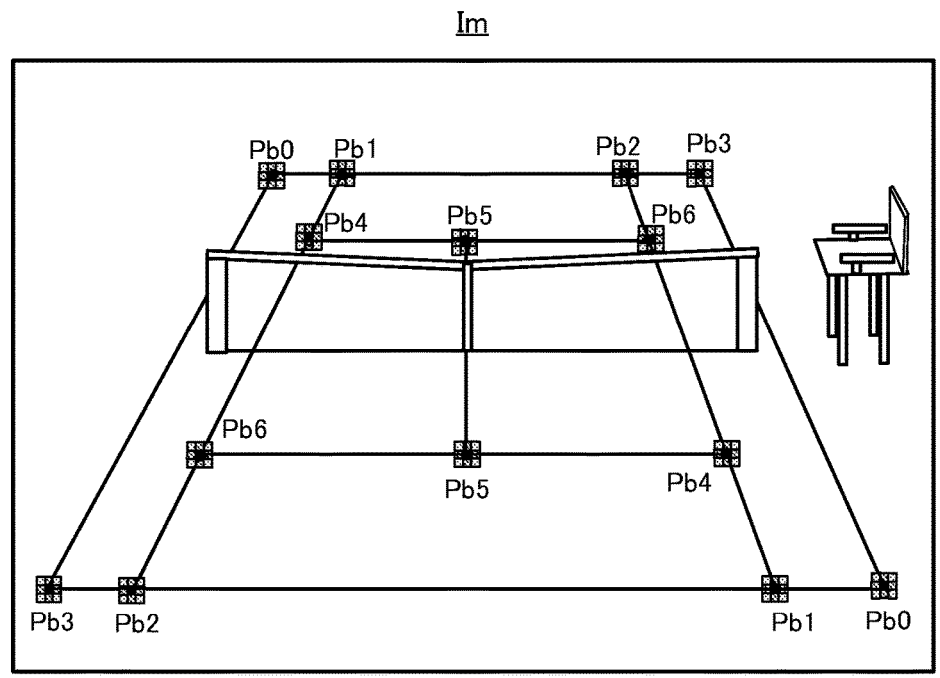
FIG. 5A illustrates first feature point information explicitly shown on a captured image.

FIG. 5A illustrates the captured image Im in which the first feature point information F1 generated based on the captured image Im is clearly indicated. Here, as an example, it is assumed that the feature extractor configured by the feature extractor parameters D1 outputs, when a captured image Im is inputted thereto, a reliability map regarding positions of feature points for each second label. For convenience of explanation, FIG. 5A shows a confidence map only for the main sub-regions (here, 3×3 or 4×4 rectangular regions) where the reliability does not become 0. Each pixel in the reliability map shall indicate that the darker the pixel is, the higher the reliability becomes. Further, in FIG. 5A, together with the reliability maps relating to the positions of the feature points, the second labels "Pb0" to "Pb6" of the feature points to which the reliability map correspond are explicitly indicated. In FIG. 5A, although the reliability maps relating to the positions of all the feature points are displayed in one image, actually, each of the reliability maps for one label is outputted from the feature extractor.

In this case, as shown in FIG. 5A, the feature extractor configured based on the feature extractor parameters D1 outputs the reliability map having the label integration number N of peaks (in this case, two peaks) for each second label based on the symmetry of the reference structure Rtag. Therefore, in this case, for each second label Pb0 to Pb6, the second label feature extracting unit 42 determines that two (that is the label integration number N) positions (coordinate values) at which the reliability becomes the local maximum value indicate the feature points corresponding to the each second labels.

Figure 5B:
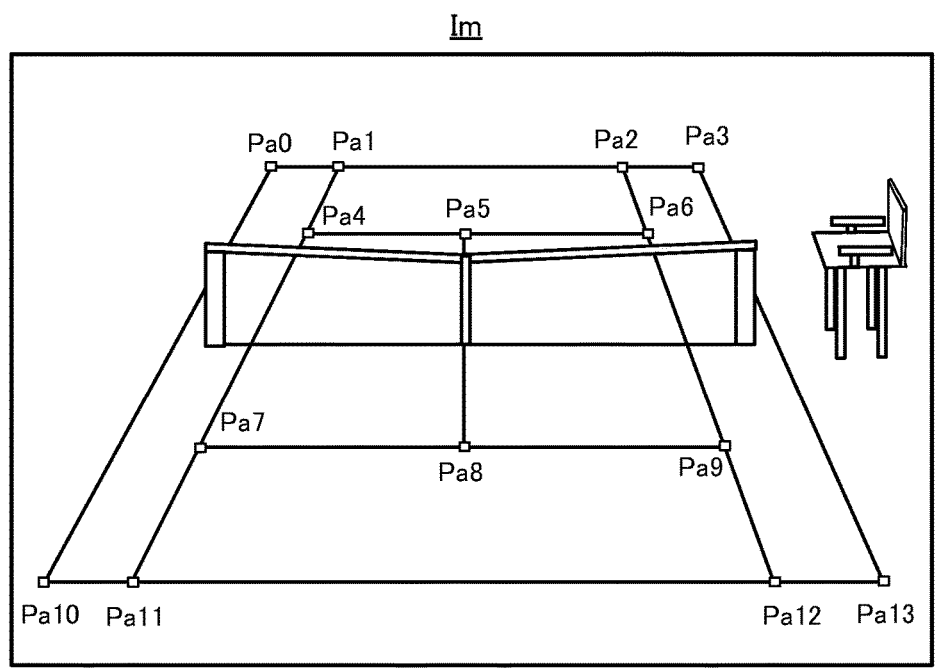
FIG. 5B illustrates second feature point information explicitly shown on the captured image.

FIG. 5B illustrates the captured image Im in which the second feature point information F2 is clearly shown. Here, for convenience of explanation, the feature points corresponding to the first labels Pa0 to Pa13 are clearly indicated by small circles. In this case, the additional information generating unit 41 identifies, based on the additional information generation data D2, the absolute positional relation between the display device 1 and the reference structure Rtag, or, the positional relation on the captured image Im between the referee chair 9 and the tennis court, then it generates the additional information Ia in accordance with the identified positional relation. Then, the first label determining unit 43 determines the first label Pa0 to Pa13 corresponding to each feature point based on the combination of the additional information Ia and the second labels Pb0 to Pb6.

Here, as an example, a description will be given of the processes executed by the additional information generating unit 41 and the first label determining unit 43 in the case of generating the additional information Ia indicative of 0 or 1.

In this case, the additional information generating unit 41 generates the additional information Ia indicative of "0" if it determines, based on the seat information and the like, that the display device 1 is present on the north side or the east side with respect to the reference structure Rtag. In contrast, the additional information generating unit 41 generates the additional information Ia indicative of "1" if it determines that the display device 1 is present on the south side or the west side with respect to the reference structure Rtag. Similarly, if the additional information generating unit 41 determines, based on the captured image Im, that the referee chair 9 is present on the front side or the right side with respect to the reference structure Rtag, the additional information generating unit 41 regards the display device 1 as being present on the north side or the east side with respect to the reference structure Rtag and therefore generates the additional information Ia indicative of "0". Further, if the additional information generating unit 41 determines, based on the captured image Im, that the referee chair 9 is present on the rear side or the left side with respect to the reference structure Rtag, the additional information generating unit 41 regards the display device 1 as being present on the south side or the west side with respect to the reference structure Rtag and therefore generates the additional information Ia indicative of "1". In the case shown in FIGS. 5A and 5B, the additional information generating unit 41 determines that the display device 1 is present on the east side with respect to the reference structure Rtag or that the referee chair 9 is present on the right side with respect to the reference structure Rtag, and therefore generates the additional information Ia indicative of "0".

If the additional information Ia indicates "0", the first label determining unit 43 assigns the first labels Pa0 to Pa6 to the feature points on the half court on the rear side or the right side, respectively, and attaches the first labels Pa7 to Pa13 to the feature points on the half court on the front side or the left side. On the other hand, if the additional information Ia indicates "1", the first label determining unit 43 assigns the first labels Pa0 to Pa6 to the feature points on the half court on the front side or the left side, and assigns the first labels Pa7 to Pa13 to the feature points on the half court on the rear side or the right side. In the examples of FIGS. 5A and 5B, since the additional information Ia indicates "0", the first label determining unit 43 assigns the first labels Pa0 to Pa6 to the feature points on the west half court on the rear side while assigning the first labels Pa7 to Pa13 to the feature points on the east half court that is on the front side.

Here, a description will be given of a method of determining the first label based on the additional information Ia using the generalized label integration number N.

First, the first label determining unit 43 divides the reference structure Rtag into symmetrical regions. In this case, the number of the divided regions (also referred to as the "divided regions") is equal to the label integration number N (in FIGS. 3 and 4, the west half court and the east half court). In addition, the divided regions have identical shapes to one another, and each divided region has feature points with the second labels which do not overlap with one another in the each divided region. Then, the first label determining unit 43 identifies the absolute (e.g., with reference to the azimuth orientation) positional relation among N (label integration number) divided regions based on the additional information Ia and the positional relation, in the captured image Im, among the divided regions. In the above-described example shown in FIGS. 5A and 5B, based on the additional information Ia, the first label determining unit 43 identifies the half court existing in the captured image Im on the rear side as the west half court and identifies the half court existing in the captured image Im on the front side as the east half court. In some embodiments, identification information such as an identification number is previously assigned to each divided region based on the absolute positional relation of each divided region, and the first label determining unit 43 recognizes the identification information of each divided region. Then, the first label determining unit 43 assigns the first label to each feature point for each identified divided region. In this case, for example, a correspondence table between the first label and the second label is previously stored in the storage unit 14 for each piece of identification information of divided regions, and the first label determining unit 43 converts the second label of each feature point existing in each divided region to the first label by referring to the correspondence table appropriate for each divided region.

As described above, the first label determining unit 43 can assign the first label to each feature point existing for each divided region on the basis of the additional information Ia and the positional relation, in the captured image Im, among the N (label integrated number) divided regions.

(4) Learning of Feature Extractor and Characteristic Object Inference Engine

Here, the learning of the feature extractor and the characteristic object inference engine will be described.

Figure 6:
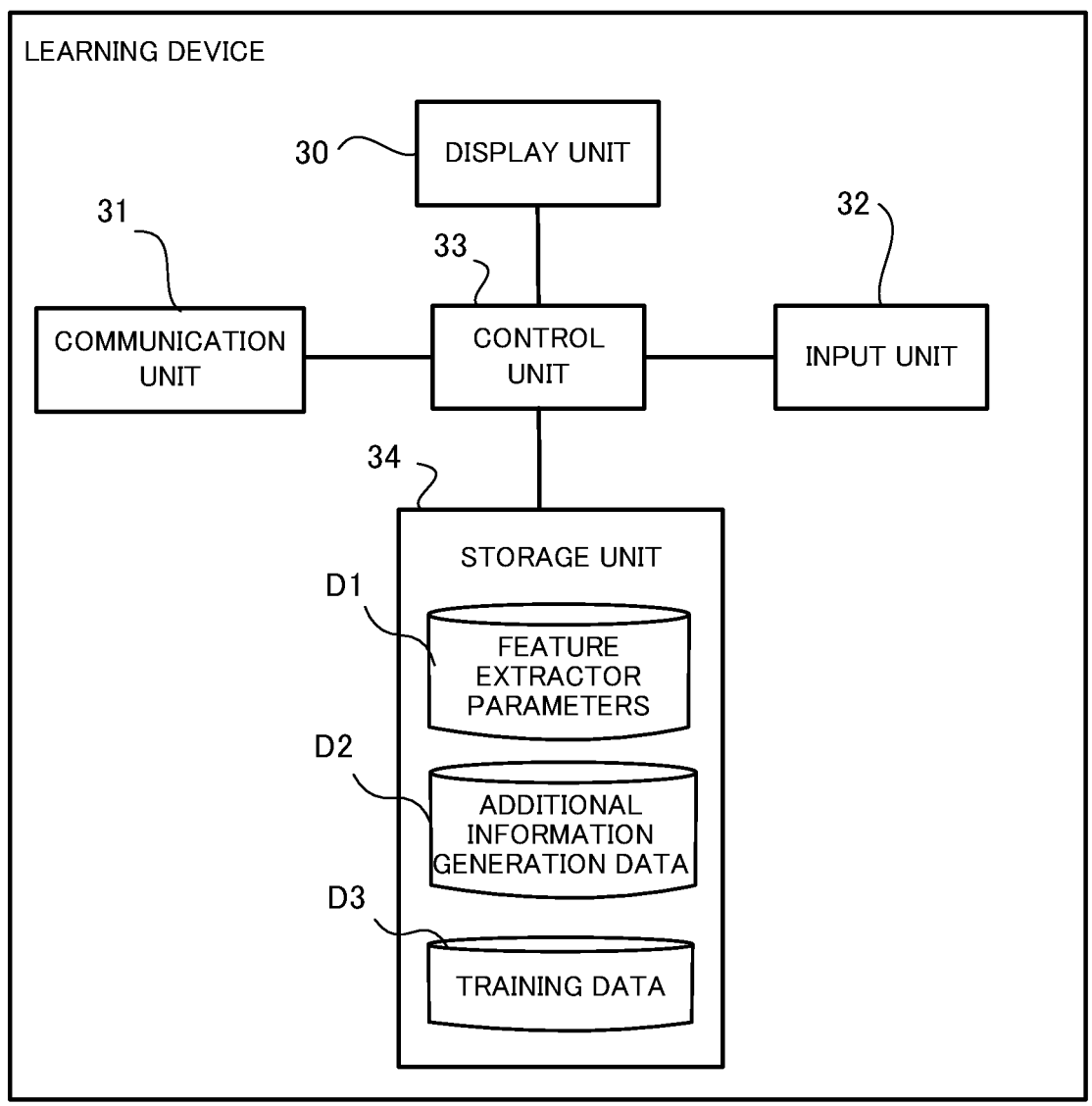
FIG. 6 illustrates a schematic configuration of a learning device.

FIG. 6 shows a schematic configuration of a learning device 3 configured to generate feature extractor parameters D1 that are parameters of a characteristic object inference engine and additional information generation data D2.

In a stage (such as the manufacturing stage of the display device 1) before the display device 1 is used by the user, the learning device 3 performs learning (also referred to as "first learning") of the feature extractor parameters D1 and learning (also referred to as "second learning") of the additional information generation data D2, which indicates parameters of the characteristic object inference engine. The learning device 3 may be the display device 1 or may be any device (e.g., a personal computer) other than the display device 1. Further, the learning device 3 may be configured by a plurality of devices. In this case, the first learning and the second learning may be performed by different devices, respectively. In addition, when the display device 1 generates the additional information Ia without using the characteristic object inference engine, the second learning may not be performed.

The learning device 3 includes a display unit 30, a communication unit 31, an input unit 32, a control unit 33, and a storage unit 34. For example, the control unit 33 includes one or more processors such as a CPU, a GPU, and a quantum processor, and a volatile memory that functions as a work memory of the processors, and performs overall control of the learning device 3. The storage unit 34 has a nonvolatile memory in which the control unit 33 stores various information necessary for learning. The storage unit 34 stores the feature extractor parameters D1 and the additional information generation data D2 generated through learning and the training data D3 used for learning.

The training data D3 includes a plurality of combinations of: image data (training image) for training in which the reference structure Rtag is imaged; and corresponding correct answer data which includes the correct answer position and its first label of each feature point existing in the corresponding training image. In this case, in some embodiments, the training data D3 may include training images obtained by imaging the reference structure Rtag in various imaging environments (e.g., environments different depending on the presence or absence of illumination or different degrees of illumination), photographing positions and angles (e.g., from various audience seats including a seat where a part of the court is captured). When it is assumed to be applied to various surface types of tennis courts, the training data D3 may include training images in which various reference structures Rtag (e.g., tennis courts corresponding to various surfaces in the case of tennis) present in plural locations are captured. In addition, the training data D3 further includes correct answer data on the position of a characteristic object (e.g., the referee chair 9) existing in the vicinity of the reference structure Rtag. Instead of storing the training data D3 by itself, the learning device 3 may acquire the training data D3 to be used by acquiring the training data D3 stored in another device connected through wired or wireless communication to the learning device 3. Similarly, the learning device 3 may store the feature extractor parameters D1 and the additional information generation data D2 generated by the learning in another device connected through wired or wireless communication to the learning device 3. Further, the learning device 3 may be configured by a plurality of devices.

Figure 7:
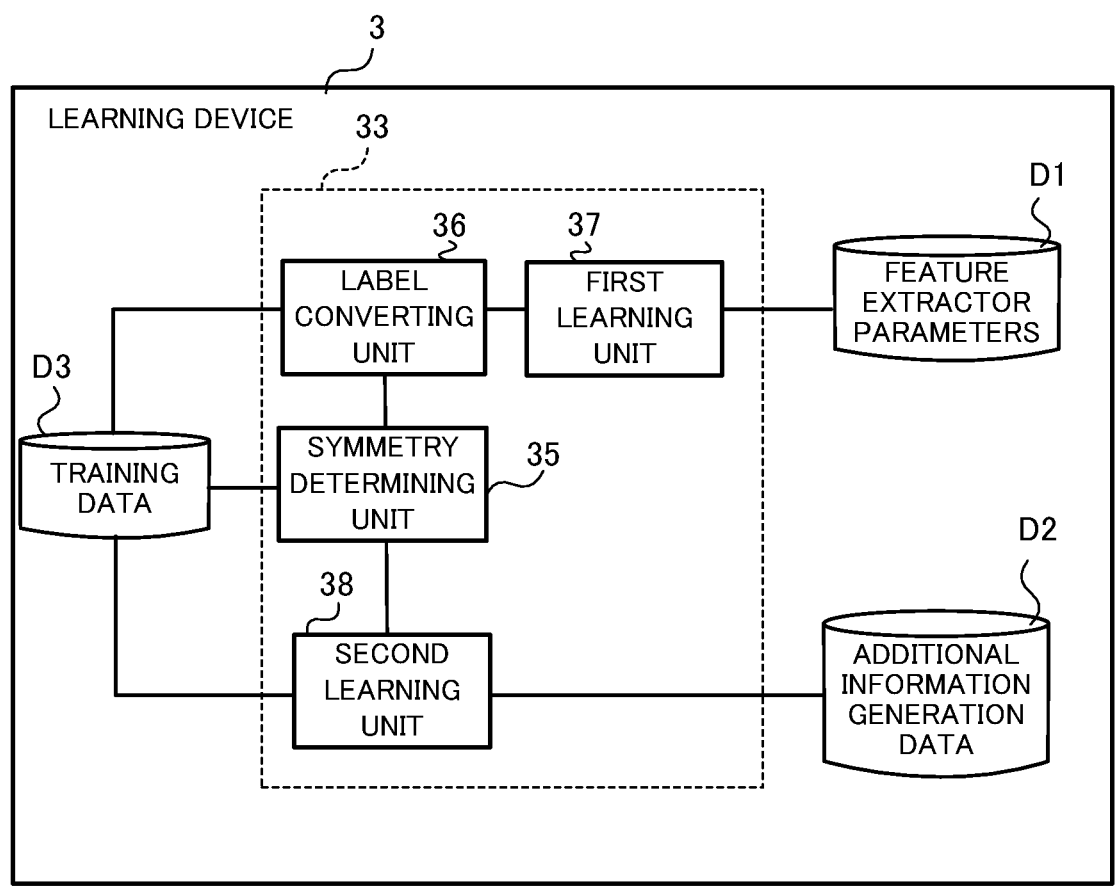
FIG. 7 illustrates an example of a functional block of the control unit of the learning device.

FIG. 7 shows an example of a functional block of the control unit 33 of the learning device 3. As shown in FIG. 7, the control unit 33 of the learning device 3 functionally includes a symmetry determining unit 35, a label converting unit 36, a first learning unit 37, and a second learning unit 38.

The symmetry determining unit 35 determines the symmetry of the reference structure Rtag prior to performing the first learning and the second learning. For example, the symmetry determining unit 35 may determine the symmetry of the reference structure Rtag based on an input from the input unit 32, or may autonomously determine the symmetry of the reference structure Rtag based on the captured image Im.

Here, a description will be given of an autonomous determination method of n-fold symmetry. The symmetry determining unit 35 generates an orthographic image of the reference structure Rtag, for example, obtained by applying orthographic transformation to plurality of captured images Im. Then, the symmetry determining unit 35 rotates the orthographic image around the center of gravity of the feature points of the reference structure Rtag in the orthographic image. Then, the symmetry determining unit 35 determines that there is a symmetry of the reference structure Rtag if every feature point in the orthographic image before and after the rotation within 360-degree matches. Then, if the symmetry determining unit 35 determines that there is a symmetry of the reference structure Rtag, the symmetry determining unit 35 further determines an integer "n" of n-fold symmetry in accordance with the rotation angle necessary to match every feature point. In this case, the label integration number N is equal to the integer n above.

Next, an autonomous determination method of line symmetry will be described. First, the symmetry determining unit 35 selects a set of two feature points satisfying the condition that "two feature points in the set are equidistant from the center of gravity of all feature points" from the feature points of the reference structure Rtag in the orthographic image. Then, if each feature point other than the two feature point overlaps with any other feature point in a case that the reference structure Rtag is bent to overlap the two feature points with each other, the symmetry determining unit 35 determines that there is a line symmetry. if it is determined that there is no characteristic object for specifying the orientation of the reference structure Rtag around the reference structure Rtag, the symmetry determining unit 35 may determine that there is no symmetry regardless of the determination result regarding n-fold symmetry or line symmetry.

After the determination of the symmetry, the learning device 3 may receive an input relating to the designation or correction of the definition of the feature points to be included in the training data D3 from the input unit 32. For example, based on the user input, the learning device 3 may determine the positions of the feature points to be extracted so that the feature points exist at symmetrical positions according to the determined symmetry.

The label converting unit 36 converts the first label included in the training data D3 into the second label based on the determination result of the symmetry by the symmetry determining unit 35. In this case, the label converting unit 36 sets the second label for each feature point so that the same first label is assigned to feature points existing at the symmetrical positions. In this case, the label converting unit 36 may store, as a part of the additional information generation data D2, table information or the like indicating the correspondence between the first label and the second label. In some embodiments, the label converting unit 36 may set each second label by receiving an input from the input unit 32 for specifying a set of first labels to be integrated (i.e., first labels associated with the same second label).

The first learning unit 37 generates the feature extractor parameters D1 by performing learning (first learning) of the feature extractor based on the training data D3 in which the second label is assigned to each feature point by the label converting unit 36. In this case, the first learning unit 37 determines the parameters of the feature extractor such that, for example, an error (loss) between a pair of information on each feature point and the second label thereof outputted by the feature extractor when a training image is inputted to the feature extractor and the correct answers of the pair indicated by the correct answer data is minimized. The algorithm for determining the parameters described above to minimize loss may be any learning algorithm used in machine learning, such as a gradient descent method or an error back-propagation method. Then, the first learning unit 37 stores the parameters of the feature extractor after the learning as the feature extractor parameters D1. It is noted that the feature extractor parameters D1 may be immediately transmitted to the display device 1 by the communication unit 31, or may be supplied to the display device 1 via a storage medium that is detachable to the learning device 3 and the display device 1.

The second learning unit 38 performs learning (the second learning) of the characteristic object inference engine based on the training images included in the training data D3 and the correct answer data regarding the position of the characteristic objects included in the training images. In this case, for example, the second learning unit 38 learns the characteristic object inference engine configured to output, when the captured image Im is inputted to the characteristic object inference engine, the positional relation in the captured image Im between the characteristic object and the reference structure Rtag. In another example, the second learning unit 38 performs learning of the characteristic object inference engine configured to output, when the captured image Im is inputted to the characteristic object inference engine, the coordinate position of the characteristic object in the captured image Im. In yet another example, the second learning unit 38 performs learning of the characteristic object inference engine configured to output, when the captured image Im is inputted to the characteristic object inference engine, additional information Ia (which indicates 0 or 1 in the example shown in FIGS. 5A and 5B) corresponding to the positional relation between the reference structure Rtag and the characteristic object. In this case, the second learning unit 38 performs the learning of the characteristic object inference engine configured to output the additional information Ia necessary for breaking the symmetry determined by the symmetry determining unit 35 (that is, having the amount of information in accordance with the label integration number N). Then, the second learning unit 38 stores the parameters of the characteristic object inference engine obtained by the second learning as the additional information generation data D2. The additional information generation data D2 may be immediately transmitted to the display device 1 by the communication unit 31, or may be supplied to the display device 1 via a storage medium which is detachable to the learning device 3 and the display device 1.

(5) Process Flow

Figure 8:
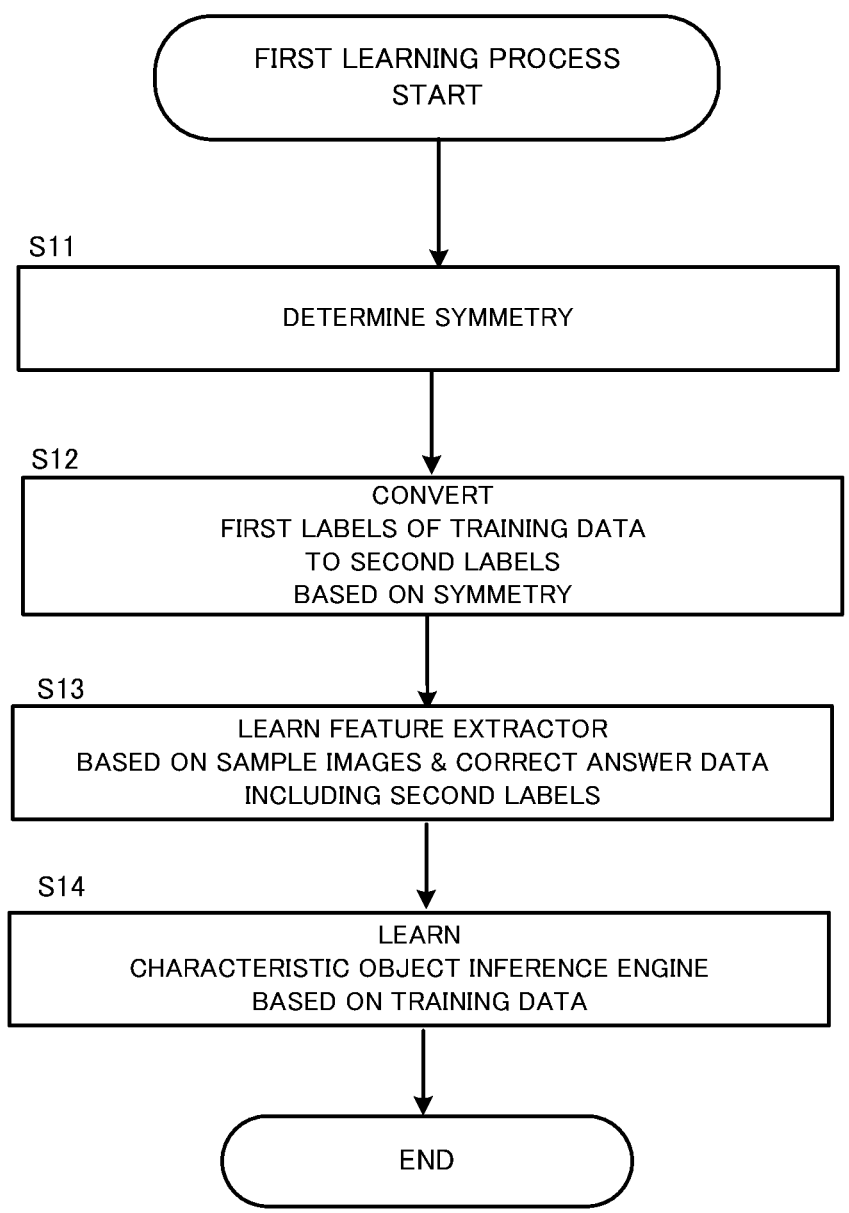
FIG. 8 illustrates an example of a flowchart showing an outline of the process to be executed by the learning device in the first example embodiment.

FIG. 8 is an example of a flowchart illustrating an outline of the process performed by the learning device 3 in the first example embodiment.

First, the symmetry determining unit 35 of the learning device 3 determines the symmetry of the reference structure Rtag (step S11). For example, based on orthographic images of the reference structure Rtag generated from training images included in the training data D3, the symmetry determining unit 35 determines whether or not there is a symmetry and the type of symmetry when there is symmetry.

Next, when there is symmetry, the label converting unit 36 of the learning device 3 converts the first labels included in the training data D3 used for learning the feature extractor into the second labels based on the determined symmetry (step S12). In this case, the label converting unit 36 converts the first labels for the feature points of the reference structure Rtag into the second labels obtained by integrating the first labels based on the type of the determined symmetry.

Then, the first learning unit 37 of the learning device 3 performs learning of the feature point extractor based on sample images and the corresponding correct data including the second labels included in the training data D3 (step S13). Accordingly, the first learning unit 37 generates the feature extractor parameters D1. If it is necessary to perform the second learning that is the learning of the characteristic object inference engine, the second learning unit 38 of the learning device 3 performs the learning of the characteristic object inference engine based on the training data D3 (step S14). Thereby, the second learning unit 38 generates the additional information generation data D2 indicative of the parameters of the characteristic object inference engine.

Figure 9:
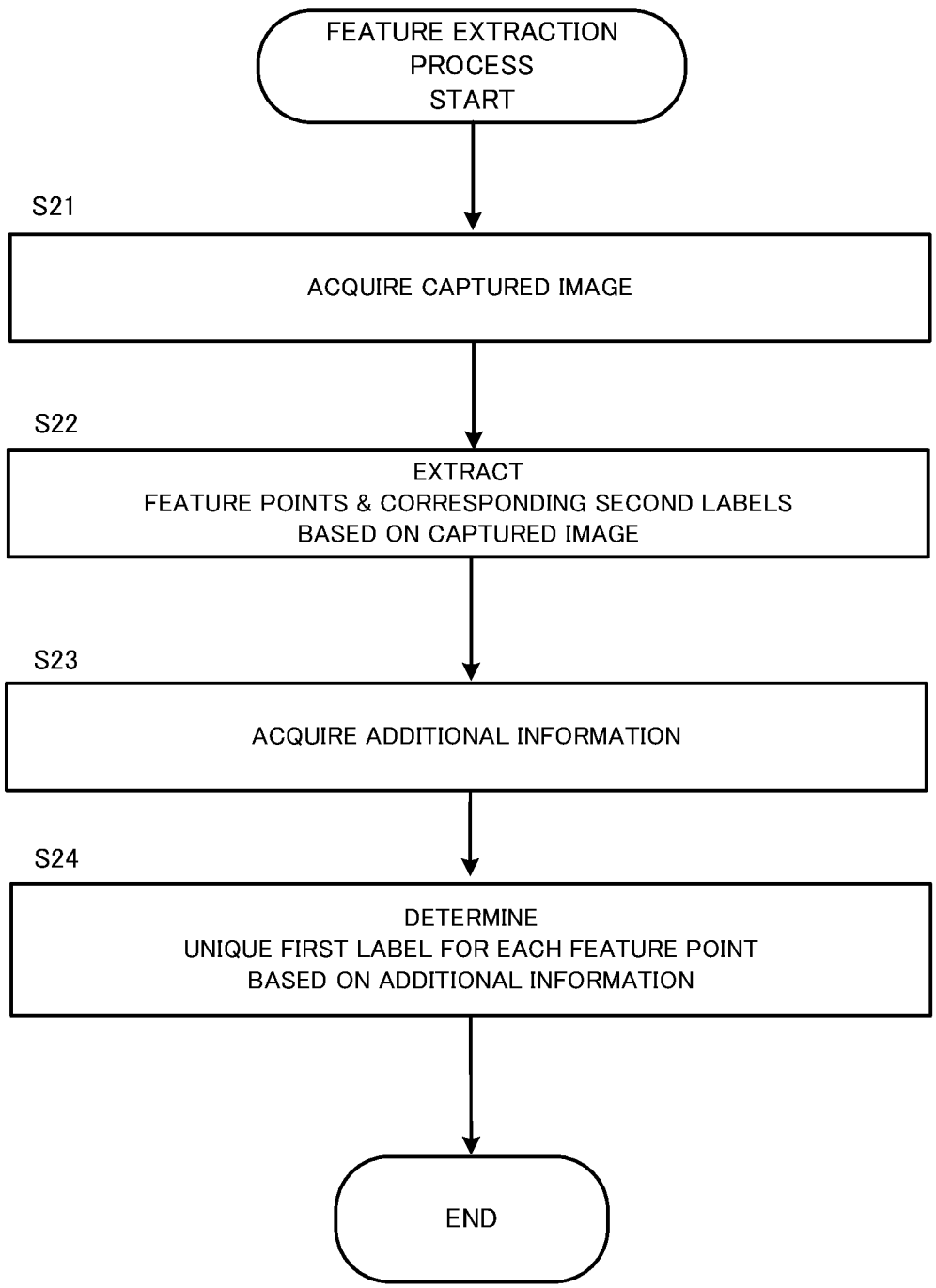
FIG. 9 illustrates an example of a flowchart relating to a feature extraction process to be executed by the display device in the first example embodiment.

FIG. 9 is an example of a flowchart relating to the feature extraction process performed by the display device 1 in the first example embodiment.

First, the captured image acquisition unit 40 of the display device 1 acquires a captured image Im generated by the imaging unit 15 (step S21). Next, the second label feature extracting unit 42 of the display device 1 extracts a combination of the positions of feature points of the reference structure Rtag and the corresponding second labels based on the captured image Im acquired at step S21 (step S22). In this case, the second label feature extracting unit 42 acquires N (label integration number) coordinate positions of the feature points for each second label based on the data outputted by the feature extractor by inputting the captured image Im to the feature extractor configured by the feature extractor parameters D1.

Further, the additional information generating unit 41 acquires the additional information Ia based on the additional information generation data D2 (step S23). In this case, based on the additional information generation data D2, the additional information generating unit 41 identifies the positional relation between the display device 1 and the reference structure Rtag and generates additional information Ia in accordance with the identified positional relation. Further, when the additional information generation data D2 indicates parameters of the characteristic object inference engine, the additional information generation unit 41 acquires the additional information Ia based on the inference result when the captured image Im is inputted to the characteristic object inference engine configured by the additional information generation data D2. It is noted that the acquisition process of the additional information Ia at step S23 may be performed before step S21 or before step S22.

Next, the first label determining unit 43 determines a unique first label for each feature point extracted at step S22 based on the additional information Ia acquired at step S23 (step S24). Thereby, the first label determining unit 43 can suitably generate the second feature point information F2 in which an appropriate first label is assigned to each feature point.

(6) Modifications

Next, modifications suitable for the first example embodiment described above will be described. The following modifications may be arbitrarily combined.

(First Modification)

The display device 1 may provide an accurate first label to each feature point based on: the additional information Ia; and the output from the feature extractor learned to output information on the position of the each feature point and the first label corresponding to the each feature point.

Figure 10:
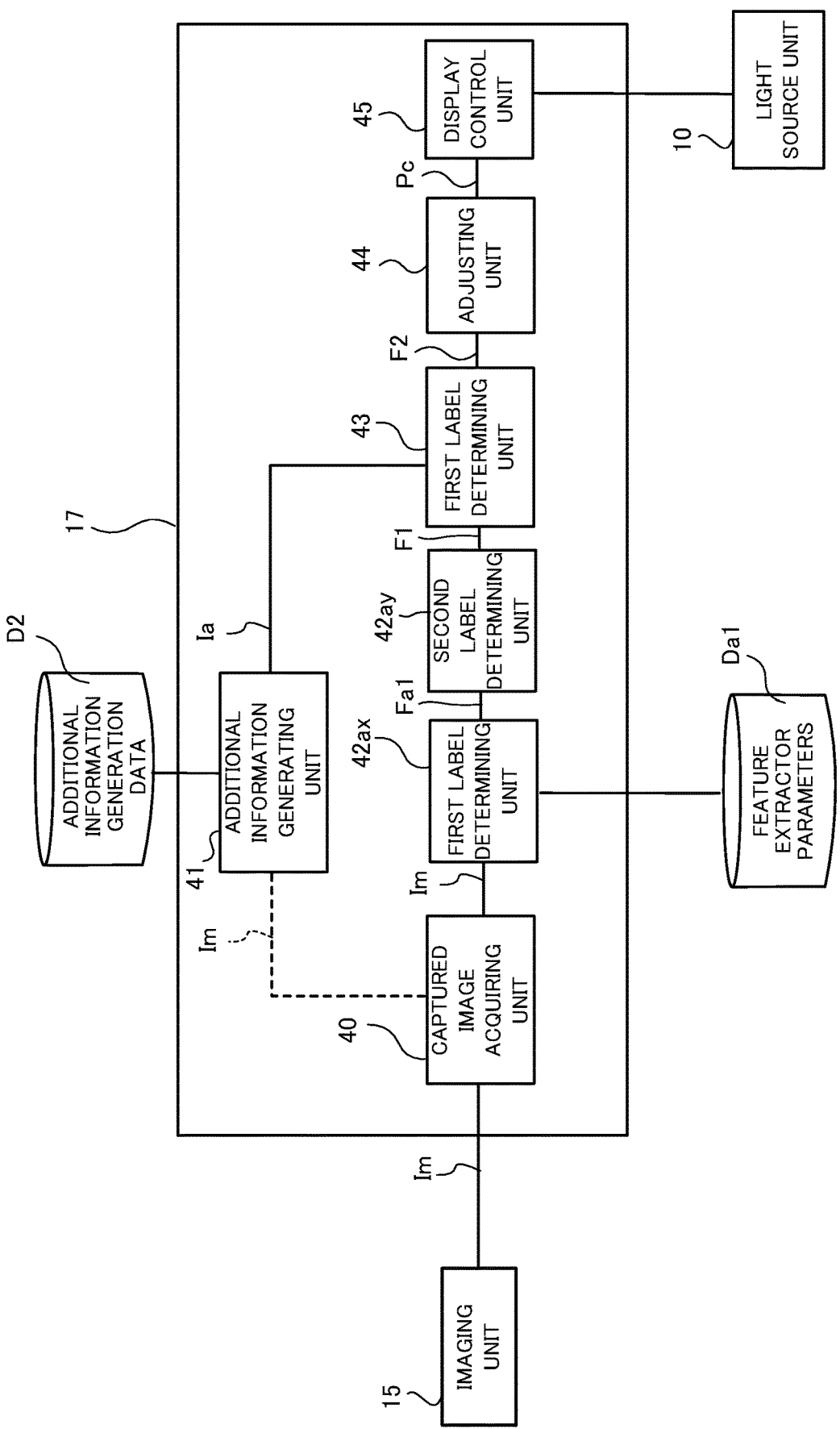
FIG. 10 illustrates an example of a functional block of the control unit according to a first modification.

FIG. 10 is an example of a functional block of the control unit 17 according to the first modification. The control unit 17 according to the first modification functionally includes a captured image acquiring unit 40, an additional information generating unit 41, a first label feature extracting unit 42ax, a second label determining unit 42ay, a first label determining unit 43, an adjusting unit 44, and a display control unit 45. It is noted that the captured image acquiring unit 40, the additional information generating unit 41, the first label determining unit 43, the adjusting unit 44, and the display control unit 45 perform the same processes as the processes explained in the functional block in FIG. 2.

The first label feature extracting unit 42ax performs feature extraction on the captured image Im supplied from the captured image acquiring unit 40 for each first label, and supplies the first feature point information "Fa1" indicating a combination of the coordinate values in the captured image Im of extracted feature points and corresponding first labels to the second label determining unit 42ay. In this case, the first label feature extracting unit 42ax configures the feature extractor based on the feature extractor parameters "Dal" generated by the first learning executed in advance, and inputs the captured image Im to the feature extractor, thereby generating the first feature point information Fa1. In the learning stage of the feature extractor parameters Dal, without performing the conversion of the first label to the second label by the label converting unit 36 shown in FIG. 7, the learning device 3 generates the feature extractor parameters Dal by performing the learning based on training images and corresponding correct answer data indicating the combinations of correct answer positions of the feature points and the corresponding first labels.

The second label determining unit 42ay converts the first label included in the first feature point information Fa1 supplied from the first label feature extracting unit 42ax into the second label based on the symmetry of the reference structure Rtag. In this case, the second label determining unit 42ay performs the same process as the process executed by the label converting unit 36 of the learning device 3 and performs the conversion from the first label to the second label. Thus, the second label determining unit 42ay converts the first feature point information Fa1 into the first feature point information F1 described in the above-mentioned example embodiment and supplies the first feature point information F1 to the first label determining unit 43. The first label determining unit 43 generates the second feature point information F2 on the basis of the additional information Ia and the first feature point information F1 in the same way as in the above-described example embodiment.

Figure 11:
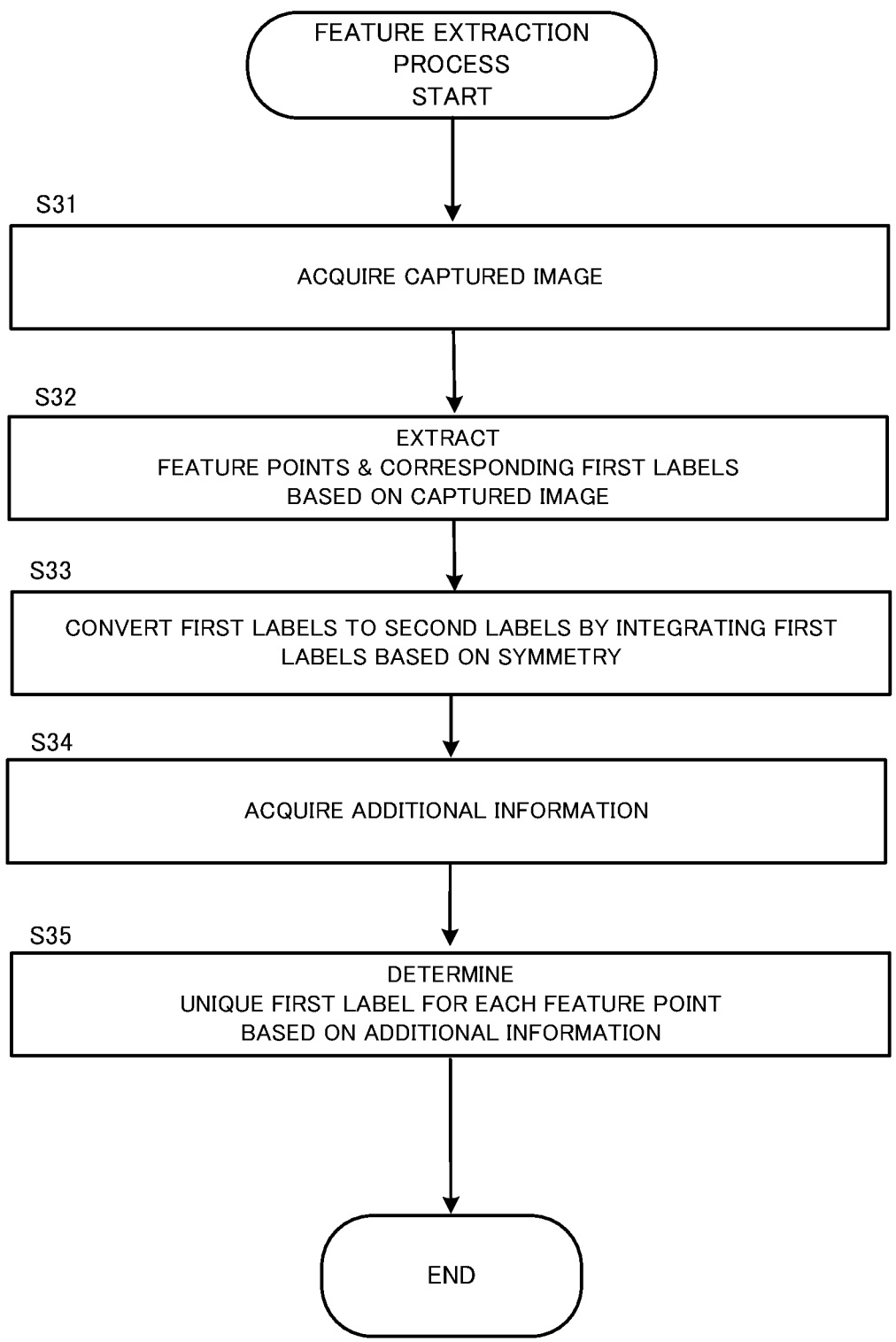
FIG. 11 illustrates an example of a flowchart relating to the feature extraction process to be performed by the display device in the first modification.

FIG. 11 is an example of a flowchart relating to the feature extraction process performed by the display device 1 according to the first modification.

First, the captured image acquisition unit 40 of the display device 1 acquires the captured image Im generated by the imaging unit 15 (step S31). Next, the first label feature extracting unit 42ax of the display device 1 extracts a combination of positions of feature points and the corresponding unique first labels (step S32). In this case, the first label feature extracting unit 42ax generates the first feature point information Fa1 indicating the coordinate position of the feature point for each first label on the basis of the output data from the feature extractor when the captured image Im is inputted to the feature extractor configured based on the feature extractor parameter Dal. The second label determining unit 42ay converts the first labels of the first feature point information Fa1 generated by the first label feature extracting unit 42ax into the second labels obtained by integrating the first labels based on the symmetry of the reference structure Rtag (step S33). Further, the additional information generating unit 41 acquires the additional information Ia based on the additional information generation data D2 (step S34). Incidentally, the process at step S34 may be executed before the process at step S31, before the process at step S32, or before the process at step S33.

Next, the first label determining unit 43 determines the first label unique to each feature point based on the additional information Ia acquired at step S34 and the second label of each feature point converted at step S33 (step S35). Thereby, the first label determining unit 43 can suitably generate the second feature point information F2 in which the coordinate position of the each feature point is accurately associated with the corresponding unique first label.

Thus, according to this modification, the display device 1 can accurately extract the positions of the feature points of the reference structure Rtag with symmetry, together with the corresponding unique first labels, based on the additional information.

(Second Modification)

The symmetric object subject to the feature extraction is not limited to the reference structure Rtag such as a sports field and a game field. Besides, the symmetry is not limited to n-fold symmetry, and may be any other symmetry.

Figure 12A:
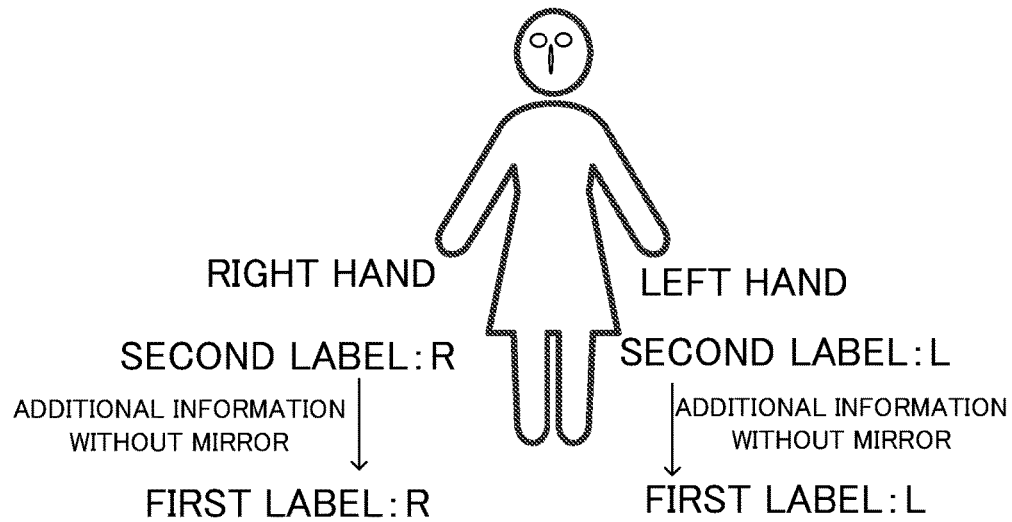
FIG. 12A illustrates a front view of a person.
Figure 12B:
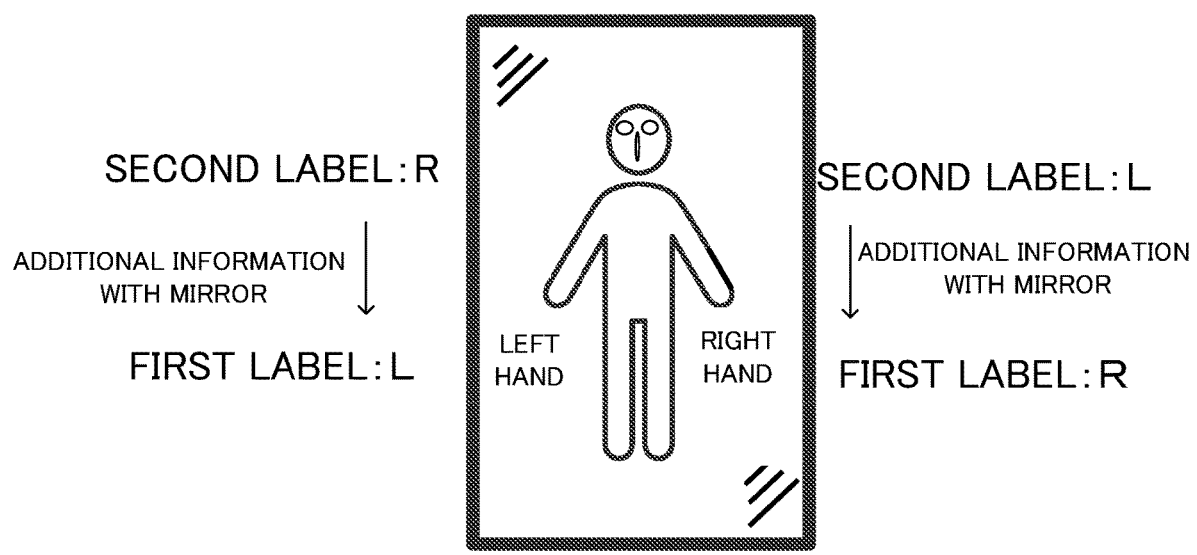
FIG. 12B illustrates a front view of a person through a mirror.

FIG. 12A is a front view of a person, and FIG. 12B is a front view of a person through the mirror. Hereinafter, a description will be given of feature extraction process in which the symmetric object subject to the feature extraction is a person and right and left hands are respectively appropriately extracted. In general, the right and left hands of a person reflected in a mirror (see FIG. 12B) are inverted with the right and left hands of a person not reflected in a mirror (see FIG. 12A). Hereafter, for convenience, the label for the right hand is referred to as "R", and the label for the left hand is referred to as "L".

In this case, in the learning stage of the feature extractor to be configured by the feature extractor parameters D1, the second label "R" is assigned to the right hand in the captured image Im and the second label "L" is assigned to the left hand in the captured image Im, regardless of whether or not it is reflected in the mirror. Then, the learning device 3 generates the feature extractor parameters D1 by training the feature extractor based on the training data D3 to which the second label is assigned. Further, in the inference stage, the display device 1 generates additional information Ia indicating whether or not it is reflected in the mirror based on the captured image Im. Then, the display device 1 converts the second label outputted by inputting the captured image Im to the learned feature extractor into the first label based on the generated additional information Ia. In this case, the display device 1 determines the second label in which "R" and "L" of the first label are interchanged if the additional information Ia indicates that it is reflected in the mirror. In contrast, if the additional information Ia indicates that it is not reflected in the mirror, the display device 1 determines the second label that is the same as the first label. In some embodiments, for example, an inference engine configured to identify whether or not a person in the inputted captured image Im is reflected in a mirror is learned in advance, and the display device may generate the additional information Ia obtained by inputting the captured image Im to the learned inference engine.

Figure 13A:
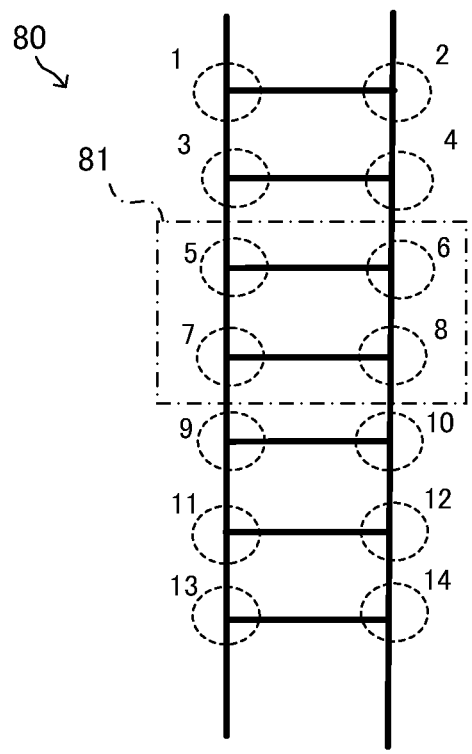
FIG. 13A illustrates a front view of a symmetrical object having a translational symmetry.
Figure 13B:
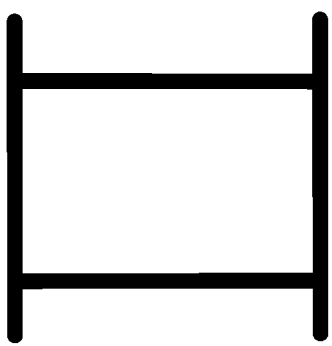
FIG. 13B is an enlarged view of the symmetrical object shown in the broken line frame.

FIG. 13A is a front view of a symmetrical object 80 having a translational symmetry, and FIG. 13B is an enlarged view the symmetrical object 80 indicated by a broken line frame 81. In FIG. 13A, the target portions of feature extraction are indicated by broken line frames, and the first labels "1" to "14" assigned to each portion are clearly shown. The symmetric object 80 is here a ladder having seven stages and has translational symmetry on a stage-by-stage basis. Then, the joint portions of the vertical bar and the horizontal bar in each stage are defined as the target portions of feature extraction.

In this case, as shown in FIG. 13B, in the learning stage of the feature extractor to be configured by the feature extractor parameters D1, the second label "0" is assigned to the target portion on the left side and the second label "1" is assigned to the target portion on the right side regardless of the number of stages in the symmetric object 80. Then, the learning device 3 generates the feature extractor parameters D1 by training the feature extractor based on the training data D3 to which the second label is attached. Further, in the inference stage, the display device 1 generates additional information Ia indicating the stage number to which each target portion corresponds by analyzing the captured image Im of the entire symmetrical object 80. Then, the display device 1 converts the second label, which is outputted from the learned feature extractor by inputting the captured image Im to the learned feature extractor, into the first label based on the generated additional information Ia. In this case, in the case where the second label indicates "0", the display device 1 determines the first label to be a value obtained by subtracting 1 from twice the stage number indicated by the additional information. In contrast, in the case where the second label indicates "1", the display device 1 determines the first label to be a value that is twice the stage number indicated by the additional information. For example, the first label of the target portion in the third stage shown in FIG. 13B whose second label is "0" is set to "5" (=3×2-1), and the first label of the target portion in the third stage whose second label is "1" is set to "6" (=3×2). The same processing may be performed by considering the symmetric object 80 as a line symmetry. In this case, for example, the second label is set to the stage number, and the display device 1 converts the second label to the first label based on additional information indicating the right side or the left side.

Thus, the display device 1 can accurately identify labels of feature points existing at symmetric positions even when an arbitrary symmetric object is selected as a target.

(Third Modification)

The process to be executed by the display device 1 may be executed by a server device which communicates with the display device 1.

Figure 14:
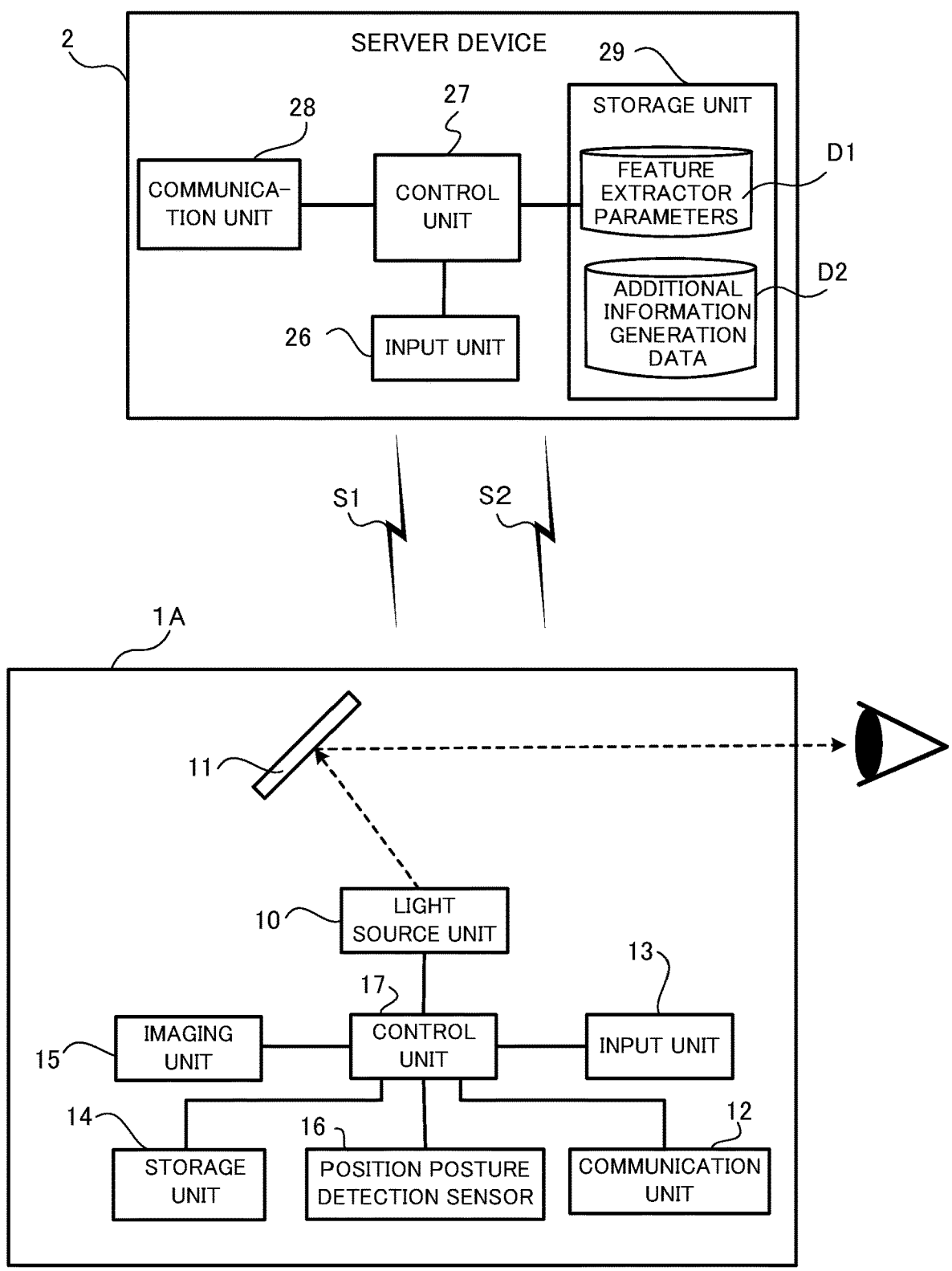
FIG. 14 illustrates a schematic configuration of a display system according to a third modification.

FIG. 14 is a schematic configuration diagram of a display system according to the second example embodiment. As shown in FIG. 14, the display system according to the second example embodiment includes a display device 1A and a server device 2.

The display device 1A transmits an upload signal "S1", which is information required for the server device 2 to perform calibration processing or the like, to the server device 2. In this case, for example, the upload signal S1 includes the captured image Im generated by the imaging unit 15 and the output signal from the position posture detection sensor 16. When receiving a distribution signal "S2" transmitted from the server device 2, the display device 1A displays the virtual object by performing the light emission control of the light source unit 10 based on the distribution signal S2.

The server device 2 generates the distribution signal S2 and distributes the distribution signal S2 to the display device 1A based on the upload signal S1 received from the display device 1A. Further, the server device 2 may be a cloud server configured by a plurality of devices. The server device 2 includes an input unit 26, a control unit 27, a communication unit 28, and a storage unit 29.

The control unit 27 includes one or more processor such as a CPU and a GPU, a volatile memory that functions as a work memory of the processors, and the like, and performs overall control of the server device 2. The storage unit 29 is a nonvolatile memory in which the control unit 27 stores various information necessary for controlling the server device 2. The storage unit 29 stores a program to be executed by the control unit 27. The storage unit 29 stores feature extractor parameters D1 and additional information generation data D2. The storage unit 29 may be an external storage device such as a hard disk connected to or built in to the server device 2, or may be a storage medium such as a flash memory. The storage unit 29 may be a server device that performs data communication with the server device 2 (i.e., a device configured to store information which can be referred to from other devices). In this case, the storage unit 29 may include a plurality of server devices and store the feature extractor parameters D1 and the additional information generation data D2 in a distributed manner.

The control unit 27 of the server device 2 has the same functional block as the functional block of the control unit 17 shown in FIG. 2. When receiving the upload signal S1 including the captured image Im from the display device 1A, the control unit 27 executes the feature extracting process according to the flowchart shown in FIG. 11 to extract a feature point of the reference structure Rtag for each first label. Then, the control unit 27 performs the calibration process and the generation process of and the distribution signal S2, and transmits the distribution signal S2 to the display device 1A by the communication unit 28.

Even according to this mode, the server device 2 can accurately grasp the first label for each feature point of the reference structure Rtag and suitably execute the calibration process. In this modification, the server device 2 is an example of the "information processing device".

(Fourth Modification)

If the relative position of the display device 1 with respect to the reference structure Rtag is predetermined, the additional information Ia may be stored in advance in the storage unit 14. In this case, the first label determining unit 43 acquires additional information Ia by reading from the storage unit 14. In this case, the additional information generating unit 41 may not be present.

(Fifth Modification)

The display device 1 is not limited to an AR device configured to be wearable on a user's head. Alternatively, the display device 1 may be a display terminal, such as a smartphone, equipped with a camera and a display (display unit). In this case, the display device 1 is equipped with a display in place of the light source unit 1 in the configuration shown in FIG. 1, and performs the feature extraction and the like of the reference structure Rtag with respect to a landscape image captured by the imaging unit 15. Then, the display device 1 superimposes one or more virtual objects corresponding to one or more images indicative of information regarding the reference structure Rtag on the landscape image and displays it on the display. Even in such cases, the display device 1 can accurately perform the feature extraction of the reference structure Rtag and display the virtual objects at appropriate positions.

Third Example Embodiment

Figure 15:
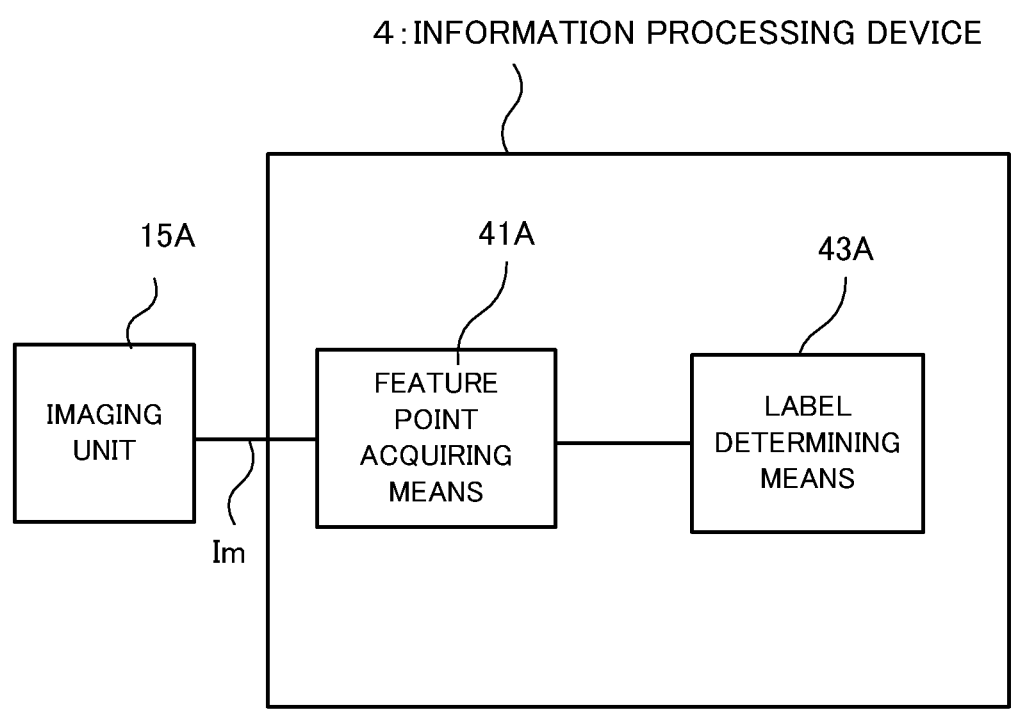
FIG. 15 illustrates a schematic configuration of an information processing device in a third example embodiment.

FIG. 15 shows a schematic configuration of an information processing device 4 in the third example embodiment. As illustrated in FIG. 15, the information processing device 4 includes a feature point acquiring means 41A and a label determining means 43A. Examples of the information processing device 4 include the control unit 17 of the display device 1 and the control unit 27 of the server device 2.

The feature point acquiring means 41A is configured to acquire, based on a captured image "Im" captured by an imaging unit 15A, a combination of positions of feature points of a symmetrical object with a symmetry and second labels defined to integrate or change first labels that are unique labels of the feature points based on the symmetry of the symmetrical object. Examples of the feature point acquiring means 41A include a combination of the second label feature extracting unit 42 shown in FIG. 2 and a combination of the first label feature extracting unit 42ax and the second label determining unit 42ay shown in FIG. 10.

The label determination means 43A is configured to determine a first label to be assigned to each of the feature points based on additional information to break the symmetry and the second labels. Examples of the label determining means 43A include the first label determining unit 43 shown in FIG. 2 or FIG. 10.

Figure 16:
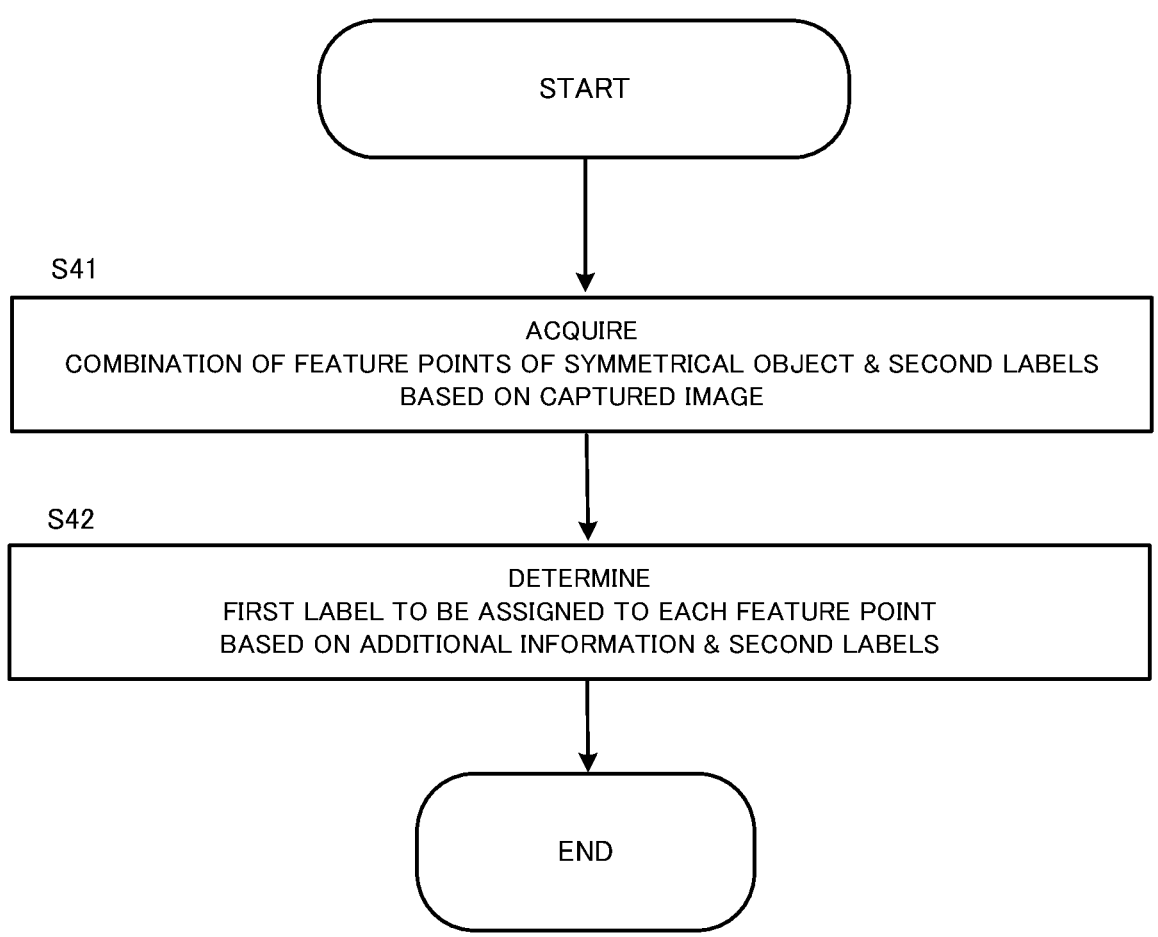
FIG. 16 illustrates an example of a flowchart showing a processing procedure of the information processing device in the third example embodiment.

FIG. 16 is an example of a flowchart to be executed by the display device 1A in the third example embodiment. First, the feature point acquiring means 41A of the information processing device 4 acquires, based on a captured image Im captured by an imaging unit 15A, a combination of positions of feature points of a symmetrical object with a symmetry and second labels (step S41). Next, the label determining means 43A of the information processing device 4 determines the first label to be attached to each of the feature point based on the additional information for breaking the symmetry and the second labels (step S42).

According to the third example embodiment, the information processing device 4 can suitably identify the positions of the feature points of the symmetrical object having a symmetry while identifying the corresponding unique first labels. The information processing device 4 is not limited to the display device 1 configured to perform the AR display in the first example embodiment or the server device 2 configured to transmit a display signal to the display device 1, and can be used in any application that requires feature extraction of a symmetrical object.

In the example embodiments described above, the program is stored by any type of a non-transitory computer-readable medium (non-transitory computer readable medium) and can be supplied to a control unit or the like that is a computer. The non-transitory computer-readable medium include any type of a tangible storage medium. Examples of the non-transitory computer readable medium include a magnetic storage medium (e.g., a flexible disk, a magnetic tape, a hard disk drive), a magnetic-optical storage medium (e.g., a magnetic optical disk), CD-ROM (Read Only Memory), CD-R, CD-R/W, a solid-state memory (e.g., a mask ROM, a PROM (Programmable ROM), an EPROM (Erasable PROM), a flash ROM, a RAM (Random Access Memory)). The program may also be provided to the computer by any type of a transitory computer readable medium. Examples of the transitory computer readable medium include an electrical signal, an optical signal, and an electromagnetic wave. The transitory computer readable medium can provide the program to the computer through a wired channel such as wires and optical fibers or a wireless channel.

The whole or a part of the example embodiments (including modifications, the same shall apply hereinafter) described above can be described as, but not limited to, the following Supplementary Notes.

[Supplementary Note 1]
An information processing device comprising:
a feature point acquiring means configured to acquire, based on a captured image captured by an imaging unit, a combination of positions of feature points of a symmetrical object with a symmetry and second labels,
the second labels being defined to integrate or change first labels that are unique labels of the feature points based on the symmetry of the symmetrical object; and
a label determination means configured to determine a first label to be assigned to each of the feature points based on
additional information to break the symmetry and the second labels.

[Supplementary Note 2]
The information processing device according to Supplementary Note 1, further comprising
an additional information generating means configured to generate the additional information in accordance with a positional relation between the symmetrical object and the imaging unit.

[Supplementary Note 3]
The information processing device according to Supplementary Note 2,
wherein the additional information generating means is configured to recognize the positional relation, based on
seat information of a wearer of the imaging unit or position information indicating a position of the imaging unit.

[Supplementary Note 4]
The information processing device according to Supplementary Note 1, further comprising
an additional information generating means configured to generate the additional information based on the captured image.

[Supplementary Note 5]
The information processing device according to Supplementary Note 4,
wherein the additional information generating means is configured to generate the additional information based on a positional relation between a characteristic object and the symmetric object,
the characteristic object existing around the symmetric object in the captured image.

[Supplementary Note 6]
The information processing device according to any one of Supplementary Notes 1 to 5,
wherein the feature point acquiring means is configured to acquire the combination of the positions of the feature points and the second labels by inputting the captured image to a feature extractor,
the feature extractor being learned to output the combination of the positions of the feature points and the second labels from an inputted image.

[Supplementary Note 7]
The information processing device according to Supplementary Note 6, further comprising:
a label conversion means configured to convert first labels of correct answer data to second labels obtained by integrating or changing the first labels based on the symmetry,
the correct answer data indicating a combination of the first labels and corresponding correct answer positions of the feature points in a training image in which the symmetric object is imaged; and
a learning means configured to learn the feature extractor based on the training image and the correct answer data including the second labels.

[Supplementary Note 8]
The information processing device according to Supplementary Note 7, further comprising
a symmetry determining means configured to determine the symmetry of the symmetric object based on the training image.

[Supplementary Note 9]
The information processing device according to any one of Supplementary Notes 1 to 8,
wherein the feature point acquiring unit is configured to acquire a combination of the positions of the feature points and the first labels by inputting the captured image to a feature extractor configured to output a combination of the positions of the feature points and the first labels from an inputted image, and then acquire the combination of the positions of the feature points and the second labels by converting the first labels to the second labels based on the symmetry.

[Supplementary Note 10]
The information processing device according to any one of Supplementary Notes 1 to 9,
wherein the information processing device is a display device comprising:
the imaging unit; and
a display unit configured to display, based on the positions of the feature points,
a virtual object superimposed on
a landscape or
an image in which the landscape is captured.

[Supplementary Note 11]
The information processing device according to any one of Supplementary Notes 1 to 10,
wherein the information processing device is a server device configured to transmit a display signal for displaying a virtual object to a display device configured to display the virtual object superimposed on a landscape.

[Supplementary Note 12]
A control method executed by a computer, the control method comprising:
acquiring,
based on a captured image captured by an imaging unit, a combination of positions of feature points of a symmetrical object with a symmetry and second labels,
the second labels being defined to integrate or change first labels that are unique labels of the feature points based on the symmetry of the symmetrical object; and
determining a first label to be assigned to each of the feature points based on
additional information to break the symmetry and the second labels.

[Supplementary Note 13]
A storage medium storing a program executed by a computer, the program causing the computer to function as:
a feature point acquiring means configured to acquire, based on a captured image captured by an imaging unit, a combination of positions of feature points of a symmetrical object with a symmetry and second labels, the second labels being defined to integrate or change first labels that are unique labels of the feature points based on the symmetry of the symmetrical object; and a label determination means configured to determine a first label to be assigned to each of the feature points based on
additional information to break the symmetry and
the second labels.

While the invention has been particularly shown and described with reference to example embodiments thereof, the invention is not limited to these example embodiments. It will be understood by those of ordinary skilled in the art that various changes in form and details may be made therein without departing from the spirit and scope of the present invention as defined by the claims. In other words, it is needless to say that the present invention includes various modifications that could be made by a person skilled in the art according to the entire disclosure including the scope of the claims, and the technical philosophy. All Patent and Non-Patent Literatures mentioned in this specification are incorporated by reference in its entirety.

DESCRIPTION OF REFERENCE NUMERALS 1, 1A Display device
2 Server device
3 Learning device
4 Information processing device
10 Light source unit
11 Optical element
12 Communication unit
13 Input unit
14 Storage unit
15 Imaging unit
16 Position posture detection sensor

What is claimed is:

1. An information processing device comprising:
   at least one memory configured to store instructions; and
   at least one processor configured to execute the instructions to acquire,
      by inputting a captured image captured by a camera to a feature extractor implemented by the at least one processor,
      a combination of positions of feature points, to which first labels for identifying the respective feature points are assigned, of a symmetrical object with a symmetry and second labels,
      the second labels being defined to integrate or change the first labels based on the symmetry of the symmetrical object,
      wherein any feature points existing at symmetrical positions to one another are assigned to be a same second label and
      wherein the feature extractor is trained to output the combination of the positions of the feature points and the second labels from an inputted image;
   determine a first label to be assigned to each of the feature points based on additional information to break the symmetry and
      the second labels;
   convert first labels of correct answer data to second labels obtained by integrating or changing the first labels based on the symmetry,
      the correct answer data indicating a combination of the first labels and corresponding correct answer positions of the feature points in a training image in which the symmetric object is imaged; and
   learn the feature extractor based on the training image and the correct answer data including the second labels.

2. The information processing device according to claim 1,
   wherein the at least one processor is configured to further execute the instructions to generate the additional information in accordance with a positional relation between the symmetrical object and the camera.

3. The information processing device according to claim 2,
   wherein the at least one processor is configured to execute the instructions to recognize the positional relation, based on
      seat information of a wearer of the camera or
      position information indicating a position of the camera.

4. The information processing device according to claim 1,
   wherein the at least one processor is configured to further execute the instructions to generate the additional information based on the captured image.

5. The information processing device according to claim 4,
   wherein the at least one processor is configured to execute the instructions to generate the additional information based on a positional relation between a characteristic object and the symmetric object,
   the characteristic object existing around the symmetric object in the captured image.

6. The information processing device according to claim 1,
   wherein the at least one processor is configured to further execute the instructions to determine the symmetry of the symmetric object based on the training image.

7. The information processing device according to claim 1,
   wherein the at least one processor is configured to execute the instructions to
      acquire a combination of the positions of the feature points and the first labels by inputting the captured image to the feature extractor configured to output a combination of the positions of the feature points and the first labels from an inputted image, and then
      acquire the combination of the positions of the feature points and the second labels by converting the first labels to the second labels based on the symmetry.

8. The information processing device according to claim 1,
   further comprising:
      the camera; and
      a display configured to display, based on the positions of the feature points, a virtual object superimposed on
         a landscape or
         an image in which the landscape is captured.

9. The information processing device according to claim 1,
   wherein the at least one processor is configured to execute the instructions to transmit a display signal to control display of a virtual object superimposed on a landscape.

10. The information processing device according to claim 1,
    wherein the at least one processor is configured to execute the instructions to divide a region of the symmetrical object in the captured image into symmetrical regions, identify an absolute positional relation among the symmetrical regions, based on the additional information and a positional relation, in the captured image, among the symmetrical regions, and assign, based on the identified absolute position relation, the first labels to the feature points included in the symmetrical regions.

11. A control method executed by a computer, the control method comprising:

acquiring,
by inputting a captured image captured by a camera to a feature extractor implemented by at least one processor,
a combination of positions of feature points, to which first labels for identifying the respective feature points are assigned, of a symmetrical object with a symmetry and second labels,
the second labels being defined to integrate or change the first labels based on the symmetry of the symmetrical object,
wherein any feature points existing at symmetrical positions to one another are assigned to be a same second label and
wherein the feature extractor is trained to output the combination of the positions of the feature points and the second labels from an inputted image;

determining a first label to be assigned to each of the feature points based on additional information to break the symmetry and
the second labels;

converting first labels of correct answer data to second labels obtained by integrating or changing the first labels based on the symmetry,
the correct answer data indicating a combination of the first labels and corresponding correct answer positions of the feature points in a training image in which the symmetric object is imaged; and learning the feature extractor based on the training image and the correct answer data including the second labels.

12. A non-transitory computer readable storage medium storing a program executed by a computer, the program causing the computer to:

acquire,
by inputting a captured image captured by a camera to a feature extractor implemented by the at least one processor,
a combination of positions of feature points, to which first labels for identifying the respective feature points are assigned, of a symmetrical object with a symmetry and second labels,
the second labels being defined to integrate or change the first labels based on the symmetry of the symmetrical object,
wherein any feature points existing at symmetrical positions to one another are assigned to be a same second label and
wherein the feature extractor is trained to output the combination of the positions of the feature points and the second labels from an inputted image;

determine a first label to be assigned to each of the feature points based on additional information to break the symmetry and
the second labels;

convert first labels of correct answer data to second labels obtained by integrating or changing the first labels based on the symmetry,
the correct answer data indicating a combination of the first labels and corresponding correct answer positions of the feature points in a training image in which the symmetric object is imaged; and learn the feature extractor based on the training image and the correct answer data including the second labels.

* * * * *